US011399282B1

(12) United States Patent
Tsai et al.

(10) Patent No.: US 11,399,282 B1
(45) Date of Patent: Jul. 26, 2022

(54) CLOUD-ASSISTED PEER-TO-PEER VIRTUAL ACCESS ENDPOINT

(71) Applicant: Amazon Technologies, Inc., Seattle, WA (US)

(72) Inventors: Kun Ting Tsai, Fremont, CA (US); Haritha Tamvada, San Jose, CA (US); Kiran Kumar Edara, Cupertino, CA (US); Sarang Wagholikar, Sunnyvale, CA (US); Nishant Suneel Sarmukadam, Pune (IN); Ramesh Radhakrishnan, Mumbai (IN)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 16/908,360

(22) Filed: Jun. 22, 2020

(51) Int. Cl.
| | |
|---|---|
| *H04L 29/06* | (2006.01) |
| *H04W 12/06* | (2021.01) |
| *H04L 9/30* | (2006.01) |
| *H04L 9/06* | (2006.01) |
| *H04B 17/318* | (2015.01) |
| *H04L 61/50* | (2022.01) |
| *H04W 8/22* | (2009.01) |
| *H04W 76/10* | (2018.01) |
| *H04L 9/32* | (2006.01) |
| *H04W 12/037* | (2021.01) |
| *H04W 12/48* | (2021.01) |

(Continued)

(52) U.S. Cl.
CPC .......... *H04W 12/06* (2013.01); *H04B 17/318* (2015.01); *H04L 9/0643* (2013.01); *H04L 9/3066* (2013.01); *H04L 9/3271* (2013.01); *H04L 61/20* (2013.01); *H04W 8/22* (2013.01);

*H04W 12/037* (2021.01); *H04W 12/48* (2021.01); *H04W 76/10* (2018.02); *H04L 61/6022* (2013.01); *H04W 88/08* (2013.01)

(58) Field of Classification Search
None
See application file for complete search history.

(56) References Cited

U.S. PATENT DOCUMENTS

| 11,153,181 B1* | 10/2021 | Tsai ................... H04L 49/354 |
| 2005/0261970 A1* | 11/2005 | Vucina ................ G06Q 20/20 |
| | | 705/16 |

(Continued)

*Primary Examiner* — Jeffery L Williams
(74) *Attorney, Agent, or Firm* — Lowenstein Sandler LLP

(57) ABSTRACT

Technologies directed to a secured peer-to-peer cloud-assisted authentication exchange protocol are described. A first wireless device receives a first request including information identifying a second wireless device. The first wireless device determines that the information matches second information. The first wireless device activates a virtual access point (VAP) with a modified service set identifier (SSID) having a group identifier appended to a first SSID. The first wireless device authenticates the second wireless device to the VAP. The first wireless device sends credentials and a second SSID to the second wireless device. The second SSID corresponds to a second access point (AP). The first wireless device receives a second request from the second wireless device to connect to the second AP. The first wireless device authenticates the second wireless device with the second AP. The first wireless device deactivates the VAP after expiration of an amount of time.

20 Claims, 12 Drawing Sheets

(51) Int. Cl.
*H04W 88/08* (2009.01)
*H04L 101/622* (2022.01)

(56) References Cited

U.S. PATENT DOCUMENTS

| | | | | |
|---|---|---|---|---|
| 2008/0049703 | A1* | 2/2008 | Kneckt | H04W 68/00 |
| | | | | 370/342 |
| 2018/0376385 | A1* | 12/2018 | Killadi | H04W 36/0011 |
| 2019/0268730 | A1* | 8/2019 | Jung | H04L 67/104 |
| 2020/0245212 | A1* | 7/2020 | Jia | H04W 88/12 |

* cited by examiner

CLOUD-ASSISTED PEER-TO-PEER VIRTUAL ACCESS ENDPOINT

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
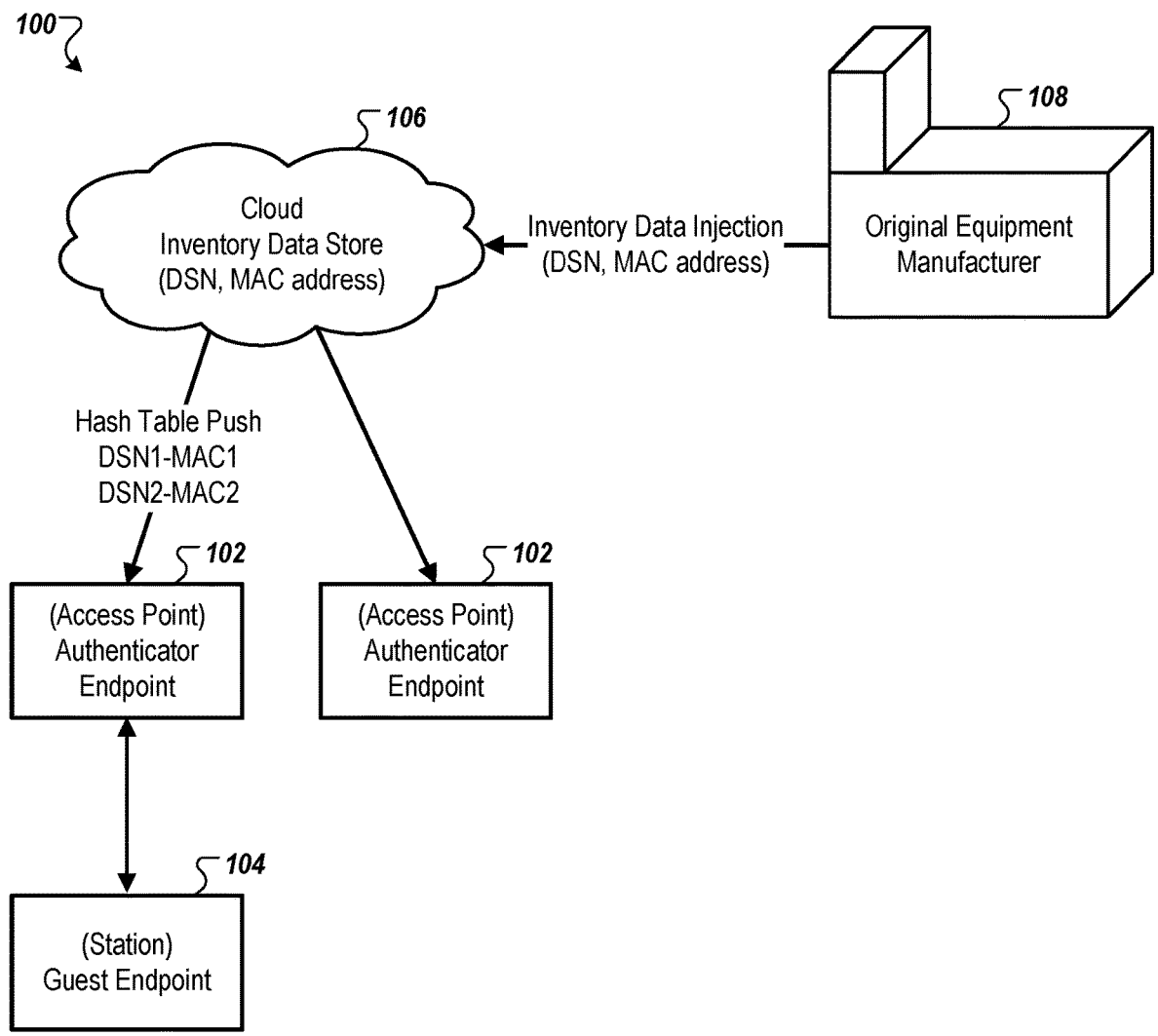
FIG. 1 is a network diagram of a peer-to-peer (P2P) network with an inventory data store stored on a remote server of a cloud to provide a hash table to an authenticator endpoint of an access point (AP) according to one embodiment.

Technologies directed to a secured peer-to-peer (P2P) cloud-assisted authentication exchange protocol are described. A P2P connection refers to a wireless connection between a pair of the network hardware devices. Traditional wireless access points can provide segmented access of wireless devices to a network through the use of virtual access points (VAPs). An access point (AP) that provides segmented access can provide one service set identifier (SSID) for one set of users and another SSID for another set of users. This allows the AP to enforce different security restrictions to different sets of users. This allows the AP to provide network isolation between the different sets of users. Typically, configuration of VAPs and their security restrictions are static and manual. Configuring, turning on, and tearing down (e.g., turning off) VAPs can require multiple operations. Once a VAP is turned on, it is typically kept running and can cause significant airtime congestion and traffic as the VAP responds to probe requests from all client devices. Have a VAP enabled on all APs then doubles the effective number of access points that are active. Having a VAP that is always on also imposes additional security risks, as this gives potential attackers an additional attack point to attack the network.

Aspects of the present disclosure address the above and other deficiencies by providing a cloud-assisted P2P authentication exchange protocol to automatically authenticate, turn on, and tear down (e.g., turn off) a VAP based on a profile and requirements of a client device. A client device profile can include a media access control (MAC) address, a user account or type, a device type, a device manufacturer, and the like. A cloud-assisted P2P virtual access endpoint, include three main components. The first is a data store which stores client device inventory information and propagates the inventory information as an inventory hash table to APs. The second is an authenticator endpoint which runs on APs that are part of a VAP endpoint network. The third is a guest endpoint which runs on client devices. The client devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The data store is a cloud inventory store that can receive inventory data from an original equipment manufacturer (OEM) for each manufactured device. The inventory data can include lists of unique device serial numbers (DSNs), MAC addresses, and certificates. The inventory data can be hashed and stored in a hash table. A hash refers to a data element, a data structure, a data item, or the like that can be stored in the hash table. The hash table can also include a validity period that indicates a duration of time that a VAP should remain active before being automatically deactivated (e.g., torn down). The hash table can also include a group identifier (ID) corresponding to each client device, which indicates a segment of the VAP that the client device could be allowed to connect to. For example, client devices with the same group identifier are segmented to the same VAP. A remote server on a cloud pushes the hash table to APs.

An AP can receive the hash table with the inventory data from the remote server. An authenticator endpoint can run on the AP, and can listen for probe requests on all of its radios and process probe requests that the AP receives from client devices (also referred to as client stations). When the authenticator endpoint receives a probe request, which includes a hash of the client device, it can parse an information element of the probe request which includes the hash of the client device. The authenticator endpoint can compare the hash of the client device with a corresponding hash stored in the hash table. In some cases, the authenticator endpoint will only compare the hash of the client device with the corresponding hash if it determines that the client device is within a sufficiently close physical proximity. For example, the authenticator endpoint can first check if a received signal strength indicator (RSSI) indicative of a wireless link between the AP and the client device is above a threshold value before matching. Additionally or alternatively, the authenticator endpoint can first check if a round-trip time (RTT) of a signal between the AP and the client device is below a threshold value before matching. If the authenticator endpoint determines that the hash of the client device matches the corresponding hash stored in the hash table, it can turn on a VAP with a modified SSID having the group identifier appended to the SSID for the validity period. The modified SSID is a temporary SSID for the VAP. When the validity period countdown expires (e.g., the duration of time that the VAP should remain active has passed), the VAP is deactivated.

A client device (e.g., a guest station) can include a guest endpoint that discovers authenticator endpoints. The guest endpoint can send a broadcast probe request to an AP with its hash embedded in the information element of the broadcast probe request. Once the authenticator endpoint validates the hash of the client device and turns on a VAP, the guest endpoint associates with the VAP and gains temporary access to the network. That is, the authenticator endpoint allows the client device to connect to the VAP. In some cases, the guest endpoint can send multiple broadcast probes to multiple APs. Once one or more of the multiple APs validates the hash of the client device and turns on a corresponding VAP, the guest endpoint can select one VAP with the highest signal strength (such as an RSSI) and associate with the VAP gaining temporary access to the network. Once the guest endpoint has gained temporary access to the network, the guest endpoint can retrieve connection information (including at least an SSID) from the remote server for a non-temporary (e.g. permanent) network. The guest endpoint can re-associate with the non-temporary network. Once the guest endpoint is associated with or latched to the non-temporary network, it can send its hash to the cloud inventory data store to remove its hash from the hash table.

FIG. 1 is a network diagram of a P2P network 100 with an inventory data store stored on a remote server 106 of a cloud to provide a hash table to an authenticator endpoint 102 of an AP according to one embodiment. In one embodiment, when a client device is manufactured, it is associated with a device identifier, such as a DSN, and a MAC address. The OEM 108 of the client device can store the DSN and the MAC address of the client device as inventory data. The inventory data can be injected or saved at a remote server 106 in the cloud. The inventory data can be stored in a hash table. The hash table can contain a hash of the client device and hashes of other client devices that have been manufactured by the OEM 108. When the client device attempts to connect to the P2P network 100, it is known as a guest endpoint 104. The hash of the guest endpoint 104 of the guest station includes a DSN, a MAC address, and a certificate of the guest endpoint 104. Each hash includes a DSN, a MAC address, and a certificate of the corresponding guest station. The remote server 106 of the cloud can push the hash table to each authenticator endpoint 102 that is part of the P2P network 100. The guest endpoint 104 can connect with an authenticator endpoint 102.

The hash further includes a validity period and a group identifier of each client device. The hash includes a validity period and a group identifier of the guest endpoint 104. In one embodiment, the validity period and the group identifier are assigned to the guest endpoint 104 by the OEM 108. In another embodiment, the validity period and the group identifier are assigned to the guest endpoint 104 by the remote server 106 of the cloud.

Figure 2:
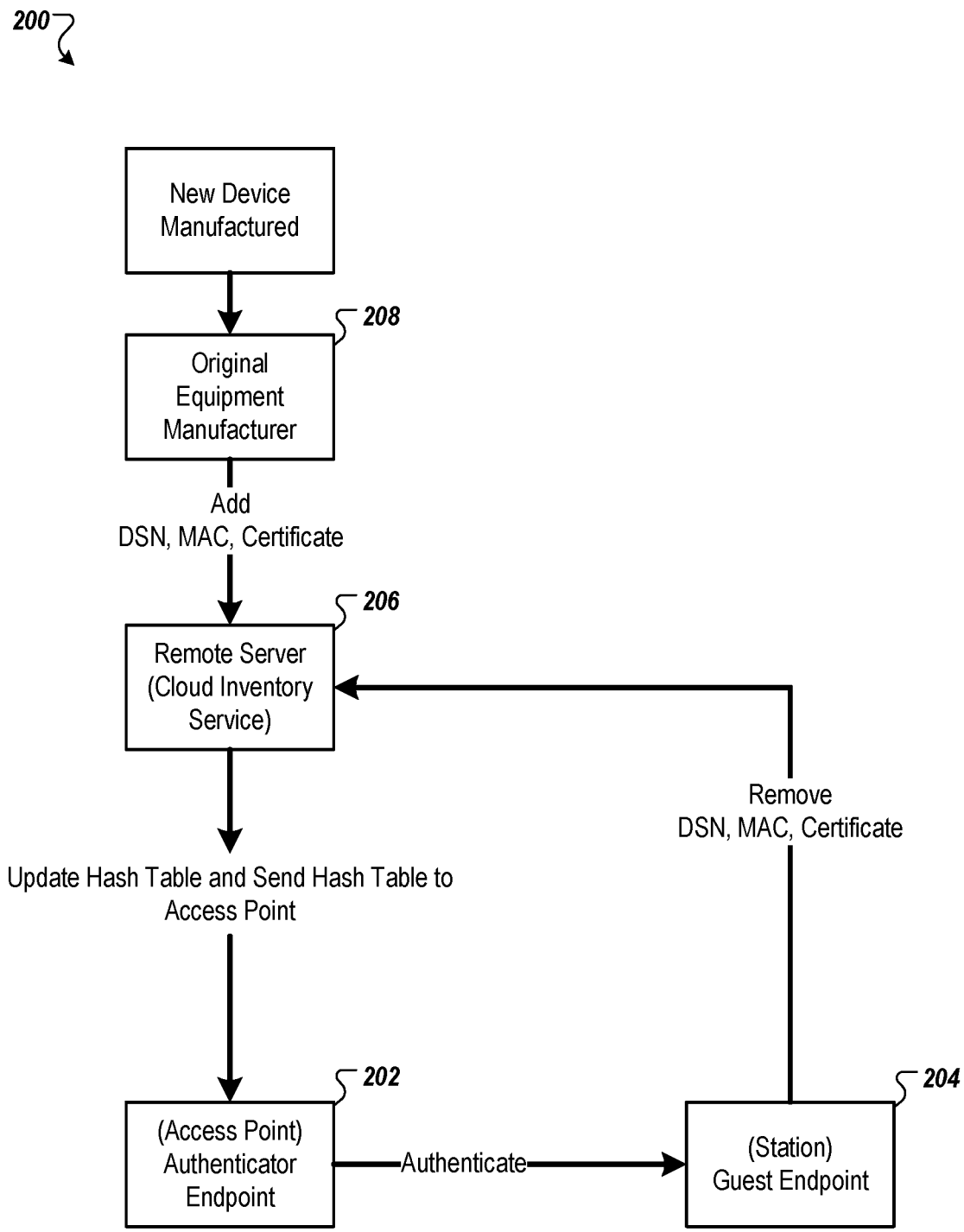
FIG. 2 is a flow chart of a hash of a client device in a P2P network according to one embodiment.

FIG. 2 is a flow chart of a hash of a client endpoint 204 in a P2P network 200 according to one embodiment. Although not all components of the P2P network 200 are shown, the P2P network 200 is similar to the P2P network 100 of FIG. 1 as noted by similar reference numbers. When a new client device is manufactured by an OEM 208, the OEM 208 adds a new has including a DSN, a MAC address, and a certificate of the new client device to a remote server 206 of a cloud. The remote server run on a cloud which can be a cloud-assisted authentication service, a cloud service, a web service, a cloud inventory service, or the like. The remote server 206 of the cloud updates a hash table stored on the remote server 206 to include the new hash. The remote server 206 sends the updated hash table to an authenticator endpoint of an authenticator endpoint 202 of an AP. In one embodiment, the authenticator endpoint 202 can authenticate a guest endpoint 204 of a guest station and allow the guest endpoint 204 of the guest station to connect to the P2P network 200. Once the guest endpoint 204 of the guest station connects to the P2P network 200, the hash of the guest endpoint 204 can be removed from the hash table in the remote server 206 on the cloud. The authenticator endpoint 202 of the AP authenticates the guest endpoint 204 of the guest station as described in further detail with respect to FIG. 3 and FIGS. 5-8. An example of a hash table is shown in Table 1 below.

TABLE 1

| Hash | Validity Period (seconds) | Signal Threshold | Group |
|---|---|---|---|
| DSN1xMAC11xMAC12xCert1 | 600 | −75 | 1 |
| DSN2xMAC21xMAC22xCert2 | 600 | −75 | 1 |
| DSN3xMAC31xMAC32xCert3 | 1200 | −85 | 2 |

Figure 3:
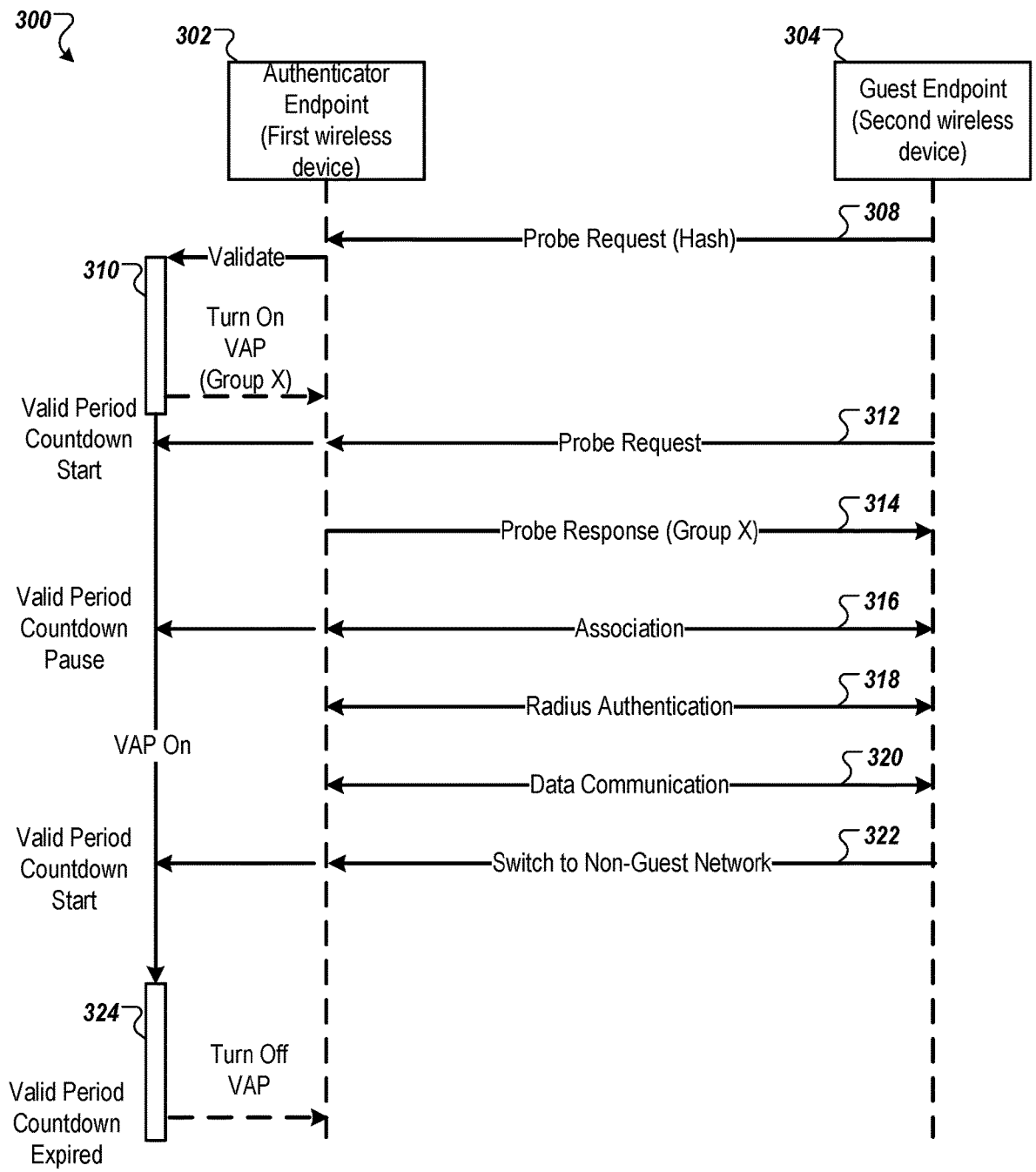
FIG. 3 is a sequence diagram of a method of operations of an authenticator endpoint and a guest endpoint in P2P network that can perform a secured P2P authentication for the guest endpoint to connect to a virtual access point (VAP) according to one embodiment.

In Table 1, a first hash entry includes a first DSN, a first MAC address and a second MAC address, and a first certificate of a first guest endpoint. The first hash entry indicates that the first guest endpoint can associate with a first segment of the VAP for 600 seconds when an RSSI between the first guest endpoint and the authenticator endpoint is above a first threshold value of −75 dB. A second hash entry includes a second DSN, a third MAC address and a fourth MAC address, and a second certificate of a second guest endpoint. The second hash entry indicates that the second guest endpoint can associate with the first segment of the VAP for 600 seconds when an RSSI between the second guest endpoint and the authenticator endpoint is above the first threshold value of −75 dB. A third hash entry includes a third DSN, a fifth MAC address and a sixth MAC address, and a third certificate of a third guest endpoint. The third hash entry indicates that the third guest endpoint can associate with a second segment of the VAP for 1200 seconds when an RSSI between the third guest endpoint and the authenticator endpoint is above a second threshold value of −85 dB FIG. 3 is a sequence diagram of a method 300 of operations of an authenticator endpoint 302 and a guest endpoint 304 in P2P network that can perform a secured P2P authentication for the guest endpoint 304 to connect to a VAP according to one embodiment. The method 300 can be performed by processing logic that comprises hardware (e.g., circuitry, dedicated logic, programmable logic, microcode, etc.), software, firmware, or a combination thereof. In one embodiment, the method 300 can be performed by any of the authenticator endpoints and guest endpoints described herein and illustrated with respect to FIGS. 1-2.

Referring back to FIG. 3, the authenticator endpoint 302 can operate on an AP and the guest endpoint 304 can operate on a guest station. The secured P2P cloud-assisted authentication exchange protocol begins when the guest endpoint 304 sends a first request (e.g., a broadcast probe request) (operation 308). The first request includes a first hash of data that identifies the guest endpoint 304. In one embodiment, the first hash includes a DSN, a MAC address, and a certificate of the guest endpoint 304. The authenticator endpoint 302 receives the first request from the guest endpoint 304. When the authenticator endpoint 302 receives the first request, the authenticator endpoint 302 attempts to validate the first the guest endpoint 304 (operation 310). In one embodiment, the authenticator endpoint 302 additionally determines an RSSI value of the first request. The RSSI value is a measure of a quality of service metric between the guest endpoint 304 and the authenticator endpoint 302.

The authenticator endpoint 302 compares the first hash with a corresponding hash (e.g., a second hash) in a hash table stored in a memory of the authenticator endpoint 302. In one embodiment, the authenticator endpoint 302 receives and stores the hash table from a remote server in a cloud prior to receiving the first probe request from the guest endpoint 304. The second hash can be stored in an entry in the hash table that was added into the hash table at the time that the guest station on which the guest endpoint 304 is running was manufactured. The hash entry includes at least a validity period value and a group identifier. The can further include a signal threshold value (e.g., such as an RSSI threshold value). Additionally or alternatively, the entry can further include a timing threshold value (e.g., such as the RTT threshold value). In one embodiment, the authenticator endpoint 302 determines that the first hash and the second hash do not match (e.g., the first request cannot be validated) and the authenticator endpoint 302 does not activate a VAP. In another embodiment, the authenticator endpoint 302 determines that the first hash and the second hash match (e.g., the first probe request is validated), and the authenticator endpoint 302 activates the VAP. The validity period value indicates a duration or an amount of time that the VAP can remain active.

Additionally or alternatively, the first request includes information that identifies the guest endpoint 304. The authenticator endpoint can determine that the information matches second information stored in a memory of the authenticator endpoint 302. The second information includes a time value that is indicative of the validity period. The second information further includes the group identifier. The second information can include the second hash including the DSN, the MAC address, and the certificate of the guest endpoint 304. In one embodiment, the authenticator endpoint receives data (e.g. a table or entries of a table) from the remote server, the data including the second information.

In one embodiment, the authenticator endpoint 302 determines if the RSSI value is greater than the signal threshold value. The RSSI value is greater than the signal threshold value when the guest endpoint 304 is within a threshold proximity (e.g., physical distance) from the authenticator endpoint 302. In another embodiment, rather than determining the RSSI value, the authenticator endpoint 302 determines an RTT value of a wireless signal between the guest endpoint 304 and the authenticator endpoint 302. The RTT is less than the RTT threshold value when the guest endpoint 304 is within the threshold proximity from the authenticator endpoint 302. In some embodiments, the authenticator endpoint 302 activates the VAP when the RSSI value is greater than the signal threshold value. In another embodiment, the authenticator endpoint 302 activates the VAP when the RTT value is less than the RTT threshold value.

The authenticator endpoint 302 activates the VAP (as part of operation 310). The VAP can be activated for an amount of time equal to the validity period value. A validation period countdown is started once the VAP is activated. The authenticator endpoint 302 sends a first response (e.g., a probe response) to the first request of the guest endpoint 304 (operation 314). The first response includes a first SSID of the VAP and a group identifier of the guest endpoint 304. In one embodiment, a first AP that hosts the VAP can host more than one VAP in order to provide network isolation for different guest endpoints with different group identifiers. The group identifier is indicative of the VAP that the guest endpoint 304 can associate with. In one embodiment, the authenticator endpoint 302 associates the guest endpoint 304 with the VAP with the first SSID (operation 316). While the authenticator endpoint 302 associates the guest endpoint 304 with the VAP, the validation period countdown can be paused. Once the authenticator endpoint 302 associates the guest endpoint 304 with the VAP, the authenticator endpoint 302 performs an authentication of the guest endpoint 304 (operation 318). In one embodiment, the authentication is a remote authentication dial-in user service (radius) authentication that can be performed with a certificate of the guest endpoint 304. In one embodiment, the radius authentication is a protocol that runs in an application layer of the network. Once the guest endpoint 304 is authenticated with the VAP, the guest endpoint 304 can communicate data with the authenticator endpoint 302 via the VAP (operation 320). In one embodiment, the data communication between the guest endpoint 304 and the authenticator endpoint 302 can allow the guest endpoint 304 to switch to a non-guest (e.g., permanent) network (operation 322) of a second AP (e.g., that hosts a non-guest network or a non-temporary network) as described in more detail herein.

In one embodiment, the authenticator endpoint 302 sends credentials and a second SSID to the guest endpoint 304. The second SSID is the SSID of the second AP and is different than the first SSID. The guest endpoint 304 sends a second request to the authenticator endpoint 302, the second request being to connect to the second AP. The second request includes the credentials. The authenticator endpoint 302 authenticates the guest endpoint 304 with the second AP. The authenticator endpoint 302 deactivates the VAP after an expiration of an amount of time equal to the time value.

In one embodiment, the authenticator endpoint 302 receives a first message from the guest endpoint 304. The first message is a message from the guest endpoint 304 to request a second SSID and credentials from a remote server. The authenticator endpoint 302 forwards the first message from the guest endpoint 304 to the remote server. That is, the authenticator endpoint 302 receives a first message requesting a second SSID and credentials. The authenticator endpoint 302 receives a second message from the remote server. The second message includes the second SSID and the credentials. The authenticator endpoint 302 sends the second message to the guest endpoint 304. The authenticator endpoint 302 receives the second request from the guest endpoint 304, the second request being to connect to the second AP. The second request includes the credentials. The authenticator endpoint 302 associates and authenticates the guest endpoint 304 with the second AP. The authenticator endpoint 302 deactivates the VAP after an expiration of an amount of time equal to the time value. In another embodiment, the authenticator endpoint 302 receives a first message requesting the second SSID and credentials and sends a second message with the second SSID and the credentials without using the remote server. That is, the second SSID and credentials can be stored locally at the authenticator endpoint 302.

In a further embodiment, the first AP hosts a second VAP with a third SSID that is different than the first SSID. The authenticator endpoint receives a third request from a second guest endpoint (not shown in FIG. 3) to connect to the second VAP. The third request includes third information that identifies the second guest endpoint. Additionally or alternatively, the third request includes a third hash of a DSN, a MAC address, and a certificate of the second guest endpoint. The authenticator endpoint determines that the third information matches fourth information that is stored in the memory. The fourth information can further include a second time value that is indicative of a validity period for the second VAP, and a second group identifier associated with the second guest endpoint, the second group identifier being different than the first group identifier. The authenticator endpoint activates the second VAP with a second modified SSID having the second group identifier be appended to the third SSID. The authenticator endpoint authenticates the second guest endpoint with the second VAP. The authenticator endpoint sends the credentials and the second SSID (of the second AP) to the second guest endpoint. The authenticator endpoint receives a fourth request from the second guest endpoint. The second guest endpoint sends the fourth request to connect to the second AP. The fourth request includes the credentials. The authenticator endpoint authenticates the second guest endpoint with the second AP. The authenticator endpoint deactivates the second VAP after an expiration of an amount of time equal to the second time value.

In one embodiment, once the guest endpoint 304 connects to the second AP and switches to the non-guest network, the validation period countdown can be restarted. When the amount of time (or duration of time) of the validation period countdown is expired, the authenticator endpoint 302 deactivates the VAP (operation 324). In some embodiments, once the guest endpoint 304 successfully switches to the non-guest network, it sends its hash to the remote sever in the cloud and the remote server removes the hash of the guest endpoint 304 from the hash table in the cloud inventory data store.

In one embodiment, the authenticator endpoint 302 operates on the first AP. The first AP is a wireless device including a radio and a memory device to store instructions. The authenticator endpoint 302 is an application processor to execute the instructions (e.g., to perform the method 300).

Figure 4:
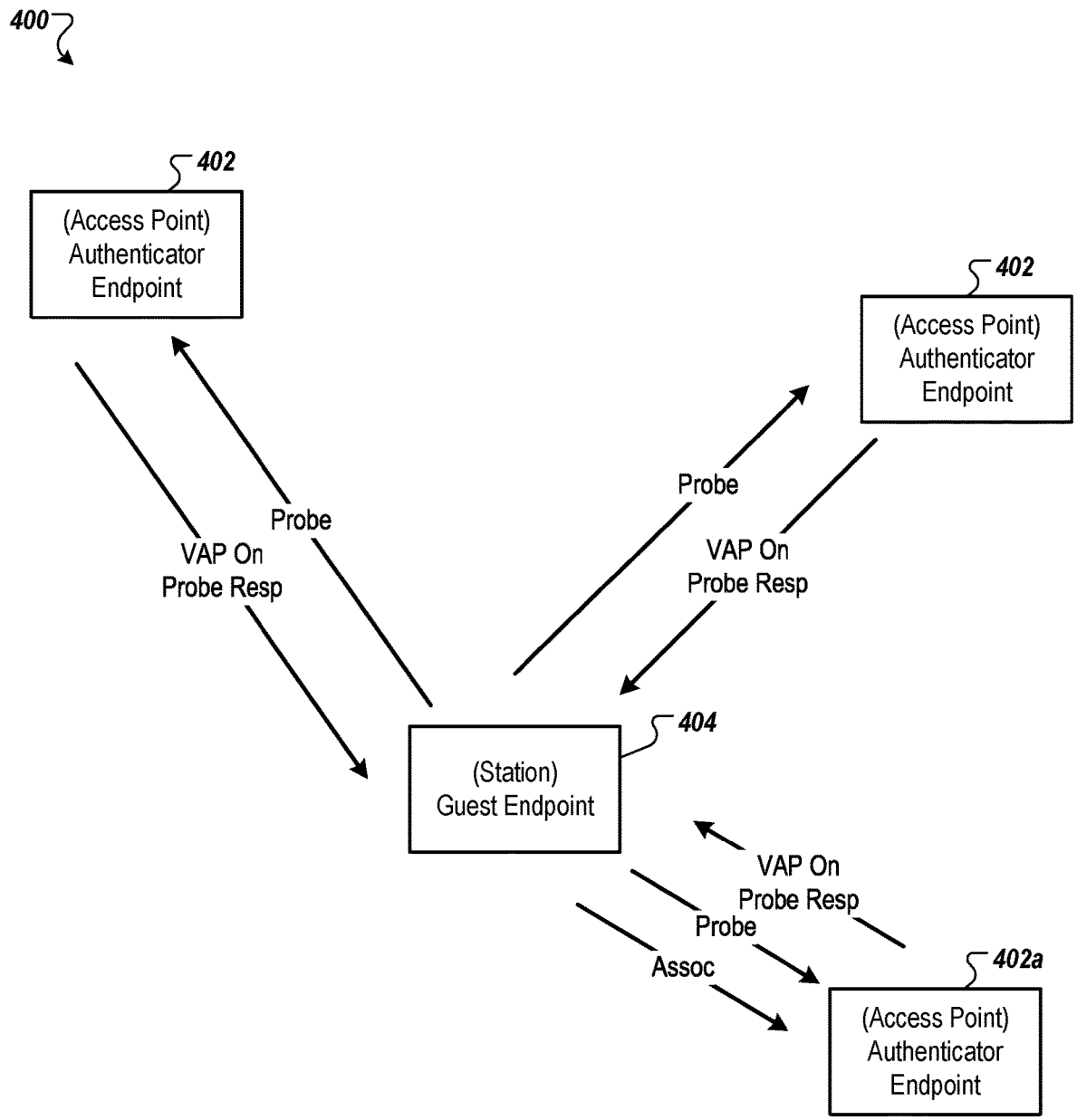
FIG. 4 is a schematic diagram of a P2P network including a set of authenticator endpoints of APs and a guest endpoint of a guest station according to one embodiment.

FIG. 4 is a schematic diagram of a P2P network 400 including a set of authenticator endpoints 402 of APs and a guest endpoint 404 of a guest station according to one embodiment. Although not all components of the P2P network 400 are shown, the P2P network 400 is similar to the P2P network 100 of FIG. 1 and the P2P network 200 of FIG. 2 as noted by similar reference numbers. In one embodiment, the guest endpoint 404 is located in proximity to three authenticator endpoints 402. The guest endpoint 404 sends out a first request (e.g., such as the first request or the broadcast probe request described with respect to FIG. 3) to each of the authenticator endpoints 402. Each authenticator endpoint 402 measures an RSSI of its received probe request, determines that the RSSI is above a threshold RSSI value, and activates a corresponding VAP. Each authenticator endpoint 402 sends a probe response (e.g., such as the first response described with respect to FIG. 3) back to the guest endpoint 404. The probe response includes at least an SSID of the corresponding VAP. The guest endpoint 404 measures a signal strength (such as an RSSI) of each probe response. The guest endpoint 404 determines that the probe response from an authenticator endpoint 402a has the highest signal strength. The guest endpoint 404 determines to associate with the authenticator endpoint 402a. In some embodiments, additional authenticator endpoints (not depicted in FIG. 4) can receive the probe request from the guest endpoint 404 and determine that the RSSI of the probe request is below the RSSI threshold value. These additional authenticator endpoints do not activate a VAP and do not send a probe response to the guest endpoint 404.

Figure 5:
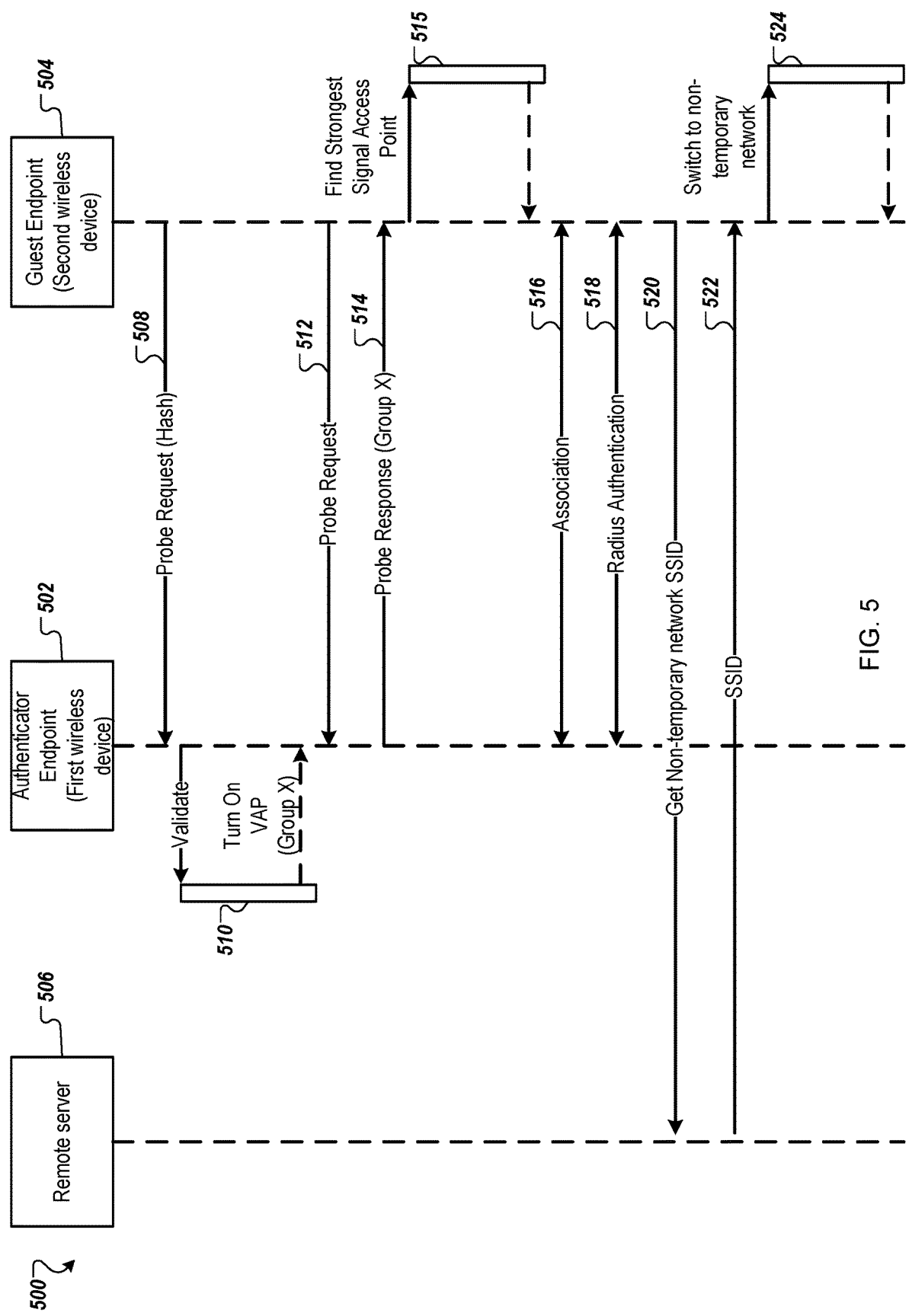
FIG. 5 is a sequence diagram of a method of operations of an authenticator endpoint and a guest endpoint in P2P network that can perform a secured cloud-assisted P2P authentication for the guest endpoint to connect to a non-temporary network according to one embodiment.

FIG. 5 is a sequence diagram of a method 500 of operations of an authenticator endpoint 502 and a guest endpoint 504 in P2P network that can perform a secured cloud-assisted P2P authentication for the guest endpoint 504 to connect to a non-temporary network according to one embodiment. The method 500 can be performed by processing logic that comprises hardware (e.g., circuitry, dedicated logic, programmable logic, microcode, etc.), software, firmware, or a combination thereof. In one embodiment, the method 500 can be performed by any of the authenticator endpoints and guest endpoints described herein and illustrated with respect to FIGS. 1-4.

Referring back to FIG. 5, the authenticator endpoint 502 can operate on a first AP and the guest endpoint 504 can operate on a guest station. The secured P2P cloud-assisted authentication exchange protocol begins when the guest endpoint 504 sends a first probe request (e.g., a broadcast probe request) (operation 508). The first probe request includes a first hash of the guest endpoint 504. The first hash includes data or information that identifies the guest endpoint 504. In one embodiment, the first hash includes a DSN, a MAC address, and a certificate of the guest endpoint 504. The first probe request can further include a group identifier of the client endpoint 504. The authenticator endpoint 502 receives the first probe request from the guest endpoint 504. When the authenticator endpoint 502 receives the first probe request, the authenticator endpoint 502 validates the first probe request of the guest endpoint 504 and activates a VAP corresponding to the group identifier of the guest endpoint 504 (operation 510). Once the VAP is validated, the authenticator sends a first probe response to the guest endpoint 504. In one embodiment, the first probe response indicates a modified SSID with a first SSID of the VAP and the group identifier corresponding to the segment of the VAP that the guest endpoint 504 can associate with.

In order to validate the first probe request, the authenticator endpoint 502 compares the first hash with a second hash (e.g., corresponding to the first hash) in a hash table stored in a memory by the authenticator endpoint 502. In one embodiment, the authenticator endpoint 502 receives and stores the hash table from a remote server 506 in a cloud prior to receiving the first probe request from the guest endpoint 504. The second hash can be stored in an entry in the hash table that was added into the hash table at the time that the guest station on which the guest endpoint 504 is running was manufactured. The hash entry includes at least a validity period value and the group identifier. The entry can further include a signal threshold value (e.g., such as an RSSI threshold value). Additionally or alternatively, the entry can further include a timing threshold value (e.g., such as the RTT threshold value). In one embodiment, the authenticator endpoint 502 determines that the first hash and the second hash match (e.g., the first probe request is validated), and the authenticator endpoint 302 activates the VAP. The validation period indicates a duration of time that the VAP can remain active.

The guest endpoint 504 sends a probe request to connect to the VAP once the VAP is activated (operation 512). The probe request can include the modified SSID with the first SSID and the group identifier. The authenticator endpoint 502 sends a first response to the guest endpoint 504 (operation 514). The second probe response can indicate the first SSID and the group identifier the VAP that the guest endpoint 504 can associate with. The first AP can host more than one VAP to provide network isolation for different guest endpoints with different group identifiers. The group identifier is indicative of a VAP that a guest endpoint can associate with.

In one embodiment, the guest endpoint 504 sends multiple broadcast probe requests (e.g., first requests) to multiple authenticator endpoints, as described with respect to FIG. 4. The guest endpoint 504 receives the probe response (e.g., first responses) from the authenticator endpoint 502. The guest endpoint 504 measures an RSSI of the probe response from the authenticator endpoint 502. The guest endpoint 504 further receives additional probe responses from the multiple authenticator endpoints, and the guest endpoint 504 measures an RSSI of each of the additional probe responses. The guest endpoint 504 determines that the probe response from the authenticator endpoint 502 has the strongest RSSI (operation 515). The guest endpoint 504 determines to associate with the authenticator endpoint 502 (operation 516), rather than any of the other multiple authenticator endpoints.

In one embodiment, the authenticator endpoint 502 associates the guest endpoint 504 with the VAP (operation 516). Once the authenticator endpoint 502 associates the guest endpoint 504 with the VAP, the authenticator endpoint 502 performs a radius authentication of the guest endpoint 504 using the certificate (operation 518). In other embodiments, the authentication can be a different type of authentication such as a two-factor authentication, or the like. Once the guest endpoint 504 is authenticated with the VAP, the guest endpoint 504 can request a second SSID of a non-temporary network of a second AP from a remote server 506 running in a cloud. In one embodiment, the authenticator endpoint 502 sends credentials and a second SSID to the guest endpoint 504 (operation 520). The second SSID is the SSID of the second AP and is different than the first SSID. The guest endpoint 504 sends a second request to the authenticator endpoint 502, the second request being to connect to the second AP. The second request includes the credentials. The authenticator endpoint 502 authenticates the guest endpoint 504 with the second AP (operation 522). The guest endpoint 504 switches to the non-temporary network of the second AP (operation 524). The authenticator endpoint 502 deactivates the VAP after an expiration of an amount of time equal to the time value.

In one embodiment, the authenticator endpoint 502 receives a first message from the guest endpoint 504. The first message is a message from the guest endpoint 504 to request a second SSID and credentials from a remote server. The authenticator endpoint 502 forwards the first message from the guest endpoint 504 to the remote server. The authenticator endpoint 502 receives a second message from the remote server. The second message includes the second SSID and the credentials. The authenticator endpoint 502 sends the second message to the guest endpoint 504. The authenticator endpoint 502 receives the second request from the guest endpoint 504, the second request being to connect to the second AP. The second request includes the credentials. The authenticator endpoint 502 associates and authenticates the guest endpoint 504 with the second AP. The authenticator endpoint 502 deactivates the VAP after an expiration of an amount of time equal to the time value. In some embodiments, once the guest endpoint 504 successfully switches to the non-guest network, the authenticator endpoint 502 requests to the remote sever in the cloud to remove the first hash and the remote server removes the first hash of the guest endpoint 504 from the hash table in the cloud inventory data store.

In a further embodiment, the first AP hosts a second VAP with a third SSID that is different than the first SSID. The authenticator endpoint receives a third request from a second guest endpoint (not shown in FIG. 5) to connect to the second VAP. The third request includes third information that identifies the second guest endpoint. Additionally or alternatively, the third request includes a third hash of a DSN, a MAC address, and a certificate of the second guest endpoint. The authenticator endpoint determines that the third information matches fourth information that is stored in the memory. The fourth information can further include a second time value that is indicative of a validity period for the second VAP, and a second group identifier associated with the second guest endpoint, the second group identifier being different than the first group identifier. The authenticator endpoint activates the second VAP with the second modified SSID having the second group identifier appended to the third SSID. The authenticator endpoint authenticates the second guest endpoint with the second VAP. The authenticator endpoint sends the credentials and the second SSID (of the second AP) to the second guest endpoint. The authenticator endpoint receives a fourth request from the second guest endpoint. The second guest endpoint sends the fourth request to connect to the second AP. The fourth request includes the credentials. The authenticator endpoint authenticates the second guest endpoint with the second AP. The authenticator endpoint deactivates the second VAP after an expiration of an amount of time equal to the second time value. In some embodiments, once the second guest endpoint successfully switches to the non-guest network, the authenticator endpoint requests to the remote sever in the cloud to remove the third hash and the remote server removes the third hash of the second guest endpoint from the hash table in the cloud inventory data store. In one embodiment, the guest endpoint 504 sends the first hash (e.g., as part of the first request in operation 508) to the authenticator endpoint as part of an information element. The authenticator endpoint 502 parses the information element in the first probe request to obtain the guest endpoint information which includes the first hash. The first hash of the guest endpoint 504 is embedded in the information element of the first probe request. The information element can include a type-length-value (TLV) table. The TLV table can include a first entry that is GUEST_ENDPOINT_HASH. The length of the first entry is the length of the first hash of the guest endpoint 504 and a TLV value of the first entry includes the DSN, a first MAC address, a second MAC address, and a certificate of the guest endpoint 504. The TLV table can include a second entry that is VIRTUAL_VAP_CHALLENGE which can be a field that the authentication endpoint 502 can send to the guest endpoint 504 as a measure to ensure that the guest endpoint 504 is not a rogue device imitating a valid guest endpoint. A length of the VIRTUAL_VAP_CHALLENGE can be a length of a challenge value (which can be a random number, a random string, or the like) generated by the authentication endpoint 502. For example, the challenge value can include alphanumeric characters, numerical values, and the like. In some embodiments, the VIRTUAL_VAP_CHALLENGE represents an encrypted random string. The TLV value is the random value or the random string that is generated by the authentication endpoint. The TLV can include a third entry that is VIRTUAL_VAP_CHALLENGE_RSP which is generated by the guest endpoint by decrypting the VIRTUAL_VAP_CHALLENGE. A length of the third entry is a length of the response of the guest endpoint 504 to the VIRTUAL_VAP_CHALLENGE that it received from the authentication endpoint 502. The TLV value of the VIRTUAL_VAP_CHALLENGE_RSP can include a response hash which includes a decrypted virtual VAP challenge and the decrypted hash of the guest endpoint 504. The VIRTUAL_VAP_CHALLENGE and the VIRTUAL_VAP_CHALLENGE_RSP are discussed further with respect to FIG. 6. In one embodiment, an information element can be a vendor-specific information element, and can be structured as follows:
Vendor-Specific Information Element
Element ID: 221
Length: <length of Vendor-specific TLVs+length of OUI>
OUI: 68-54-FD
enum Vendor-specific TLVType {
GUEST_ENDPOINT_HASH,
VIRTUAL_VAP_CHALLENGE,
VIRTUAL_VAP_CHALLENGE_RSP
};
Vendor-Specific TLV Table

| TLV Type | TLV Length | TLV Value |
|---|---|---|
| GUEST_ENDPOINT_HASH | Length of hash | Hash of Data: DSN1xMAC11xMAC12xCert1 |
| VIRTUAL_VAP_CHALLENGE | Length of random challenge | Random value |
| VIRTUAL_VAP_CHALLENGE_RSP | Length of response to Virtual VAP challenge | Hash of (Virtual VAP challenge, Hash of Data) |

Figure 6:
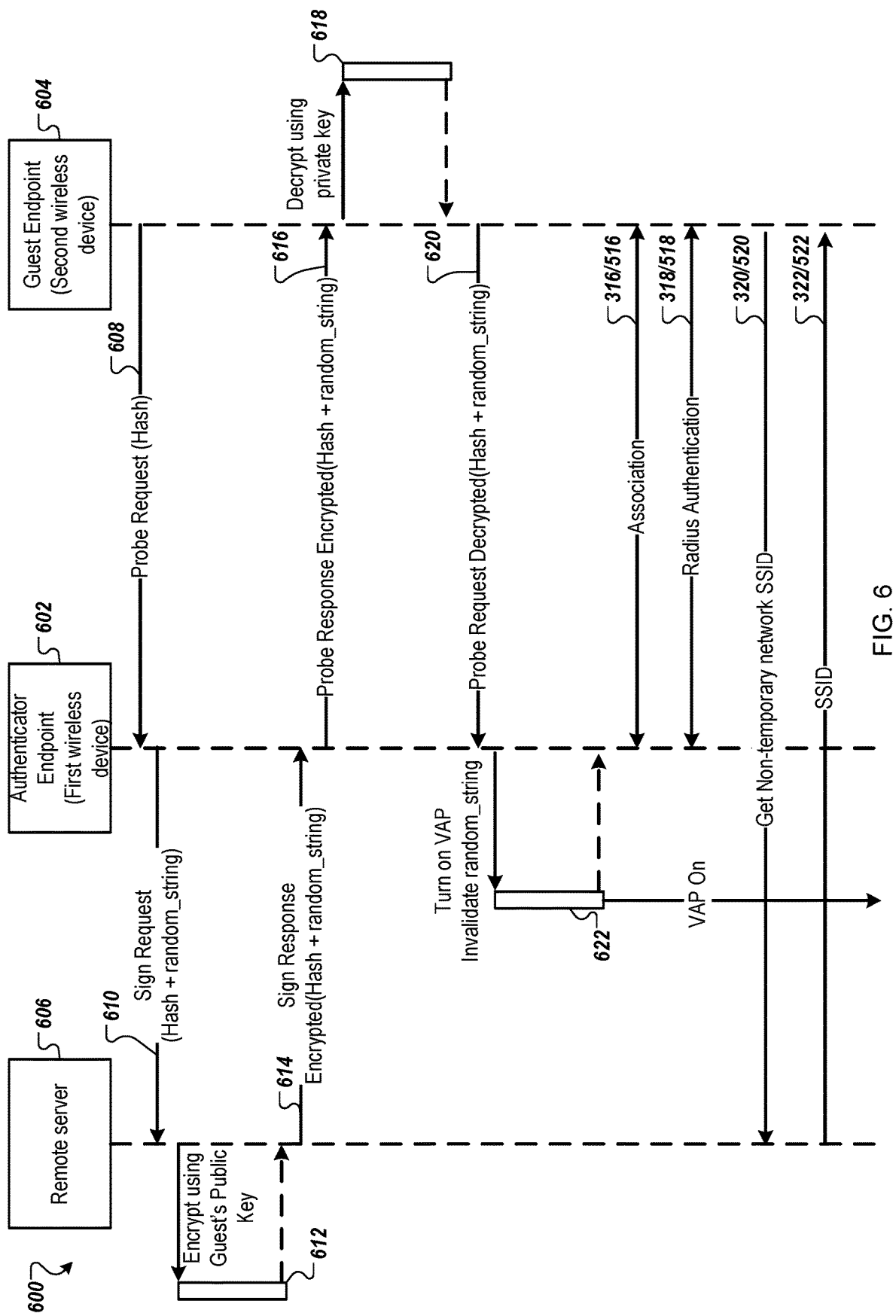
FIG. 6 is a sequence diagram of a method of operations to prevent probe request attacks from rogue devices in a secured cloud-assisted P2P authentication exchange protocol according to one embodiment.

FIG. 6 is a sequence diagram of a method 600 of operations to prevent probe request attacks from rogue devices in a secured cloud-assisted P2P authentication exchange protocol according to one embodiment. The method 600 can be performed by processing logic that comprises hardware (e.g., circuitry, dedicated logic, programmable logic, microcode, etc.), software, firmware, or a combination thereof. In one embodiment, the method 600 can be performed by any of the authenticator endpoints, guest endpoints, and remote servers described herein and illustrated with respect to FIGS. 1-5.

In some cases, a rogue (e.g., malicious) device can attempt to imitate a valid guest endpoint (e.g., such as the guest endpoints described with respect to FIGS. 1-5) by sending an attack probe request and keeping a VAP on indefinitely. In order to ensure that a rogue device does not imitate a valid guest endpoint by sending an attack probe request, a cloud-based challenge request and response protocol can be used to authenticate a guest endpoint operating on a guest station before an authenticator endpoint turns on (activates) a VAP. The method 600 outlines the cloud-based challenge request and response protocol.

Referring back to FIG. 6, an authenticator endpoint 602 can operate on an AP and a guest endpoint 604 can operate on a guest station. The secured P2P cloud-assisted authentication exchange protocol begins when the guest endpoint 604 sends a first probe request (operation 608). The first probe request can include an information element (such as described in reference to FIG. 5) and the information element can include a first field (GUEST_ENDPOINT_HASH TLV). The first probe request includes a first hash (e.g., in the first field of the information element) of the guest endpoint 604. The first hash includes data or information that identifies the guest endpoint 604. In one embodiment, the first hash includes a DSN, a MAC address, and a certificate of the guest endpoint 604. The first probe request can further include a group identifier of the guest endpoint 604. The authenticator endpoint 602 receives the first probe request from the guest endpoint 604. The authenticator endpoint 602 generates a random string. The random value can be a challenge value, a challenge string, a random value, or the like. The authenticator endpoint 602 sends the random string and the first hash of the guest endpoint 604 to a remote server 606 in a cloud (operation 610). The random string and the first hash can be sent to the remote server 606 as a signed request. The remote server 606 encrypts the random string and the first hash using a public key associated with the guest endpoint 604 (operation 612). In one embodiment, the public key of the guest endpoint 604 is known to the remote server 606 prior to receiving the random string and the first hash. In another embodiment, the guest endpoint 604 can send the public key to the authenticator endpoint 602 and the authenticator endpoint 602 can send the public key to the remote server 606 in connection with the random string and the first hash. The remote server sends a second response to the authenticator endpoint 602. The second response includes encrypted data including an encrypted random string and an encrypted hash (e.g., the random string and the first hash that are encrypted using the public key associated with the guest endpoint 604) to the authenticator endpoint 602 (operation 614). The authenticator endpoint 602 receives the second response. The authenticator endpoint 602 sends the encrypted data to the guest endpoint 604 as part of a first response (e.g., the first response including the first SSID of the VAP and the group identifier, as described with respect to FIG. 3 and FIG. 5). The first response includes an information element including a second field (VIRTUAL_VAP_CHALLENGE TLV). The authenticator endpoint 602 sends the first response including the second field to the guest endpoint 604 (operation 616). The second field includes the encrypted data. The encrypted data is used as a challenge request in the first response. The guest endpoint 604 decrypts the encrypted data using a private key associated with the guest endpoint 604 to obtain a decrypted string (operation 618). The guest endpoint 604 sends a probe request including the decrypted string and the decrypted hash to the authenticator endpoint 602 (operation 620). The probe request includes an information element which includes a third field (VIRTUAL_VAP_CHALLENGE_RSP TLV). The third field contains the decrypted string. The guest endpoint 604 sends the probe request to the authenticator endpoint 602. The probe request is a challenge response of the guest endpoint 604 to the challenge request from the authenticator endpoint 602. The authenticator endpoint 602 receives the decrypted string and the decrypted hash from the guest endpoint 604. The authenticator endpoint 602 compares the decrypted string from the guest endpoint 604 to the random string that it generated (e.g., before operation 610) and activates the VAP if the decrypted string and the random string match (operation 622). The authenticator endpoint 602 determines that the decrypted string matches the random string and the VAP is activated for an amount of time corresponding to a validity period. The authenticator endpoint 602 then invalidates the random string (e.g., so that it cannot be reused for authenticating another client endpoint, such as a rogue client endpoint) (operation 622). The method 600 completes the operations 316-324 of FIG. 3 and 516-524 of FIG. 5 as described and illustrated herein and the method 600 ends. The method 600 ensures that the VAP is only activated for authenticated client endpoints. The method 600 can thwart probe request attacks from rogue client devices.

In another embodiment, instead of sending the decrypted string and the decrypted hash, the guest endpoint 604 can re-encrypt the hash and the random string using a key, such as a public key associated with the authenticator endpoint 602.

Figure 7:
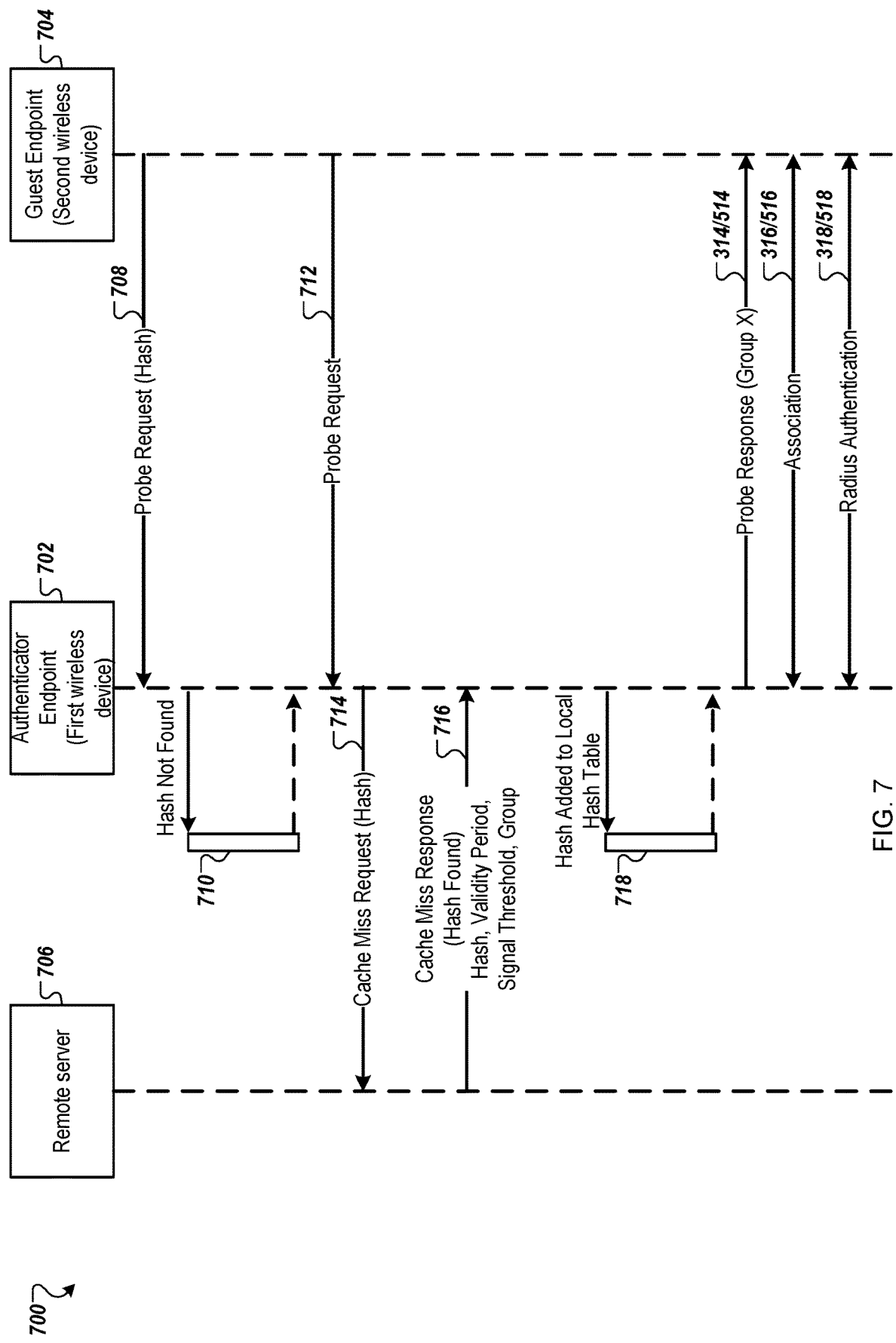
FIG. 7 is a sequence diagram of a method of operations to populate a hash table in a secured cloud-assisted P2P authentication exchange protocol according to one embodiment.

FIG. 7 is a sequence diagram of a method 700 of operations to populate a hash table in a secured cloud-assisted P2P authentication exchange protocol according to one embodiment. The method 700 can be performed by processing logic that comprises hardware (e.g., circuitry, dedicated logic, programmable logic, microcode, etc.), software, firmware, or a combination thereof. In one embodiment, the method 700 can be performed by any of the authenticator endpoints, guest endpoints, and remote servers described herein and illustrated with respect to FIGS. 1-6.

In some cases an authentication endpoint, such as authentication endpoint 702, can operate on a first AP that has limited memory. In such cases, a remote server 706 in a cloud can be utilized to cache the hash table. When the authentication endpoint 702 receives a first probe request from a guest endpoint 704, the authentication endpoint 702 checks its local hash table to check if the guest endpoint 704 exists (e.g., has an entry) in the local hash table. If there is an entry for the guest endpoint 704 in the local hash table, the processing logic performs methods and operations as described with respect to FIG. 3 and FIGS. 5-6. If there is no entry for the guest endpoint 704 in the local hash table, the processing logic performs the method 700.

Referring back to FIG. 7, an authenticator endpoint 702 can operate on an AP and a guest endpoint 704 can operate on a guest station. The secured P2P cloud-assisted authentication exchange protocol begins when the guest endpoint 704 sends a first probe request (operation 708). The authenticator endpoint 702 checks a local hash table to identify a hash entry corresponding to the first hash of the guest endpoint 704 (operation 710). The local hash table can be stored on a memory of the authenticator endpoint 702. The authenticator endpoint 702 determines that the local hash table does not contain the hash entry corresponding to the first hash. The guest endpoint 704 sends a probe request to the authenticator endpoint 702 (operation 712). The authenticator endpoint 704 receives the probe request and sends a miss request to the remote server 706 in the cloud (operation 714). The miss request can be a cache miss request including the first hash of the guest endpoint 704. The remote server 706 in the cloud can identify the corresponding hash entry of the guest endpoint 704 in its cloud inventory data store and can send a miss response to the authenticator endpoint 702 (operation 716). The miss response can be a cache miss response that indicates that the hash entry of the guest endpoint 704 was found. The miss response can include the first hash of the guest endpoint 704, a validity period indicating a duration of time during which a VAP can be activated for the guest endpoint 704, a signal threshold (such as an RSSI threshold value) to determine whether or not to activate the VAP for the guest endpoint 704, and a group identifier indicating a segment of the VAP that the guest endpoint 704 can connect to. The authenticator endpoint 702 can add or append the hash entry of the guest endpoint 704 from the remote server 706 to the local hash table (operation 718). The method 700 completes the operations 314-324 of FIG. 3 and 514-524 of FIG. 5 as described and illustrated herein and the method 700 ends.

In another embodiment, the guest endpoint 704 can provide a temporary hash (e.g., a one-time hash or other dynamic hash) to the remote server 706, such as in an out-of-band communication link (e.g., a cellular link). When the guest endpoint 704 sends the first probe request at operation 708, the authenticator endpoint 702 determines that the local hash table does not contain the temporary hash in the hash table. The authenticator endpoint 704 sends a miss request to the remote server 706 in the cloud at operation 714. The miss request can be a cache miss request including the temporary hash of the guest endpoint 704. The remote server 706 in the cloud can identify the corresponding hash entry of the guest endpoint 704 in its cloud inventory data store and can send a miss response to the authenticator endpoint 702 at operation 716. The miss response can be a cache miss response that indicates that the hash entry of the guest endpoint 704 was found. The miss response can include the temporary hash of the guest endpoint 704, the validity period, the signal threshold, and the group identifier. The authenticator endpoint 702 can add or append the temporary hash to a hash entry to the local hash table at operation 718. Alternatively, the temporary hash (or any retrieved hash from the remote server) is not cached or stored in the local hash table.

Figure 8:
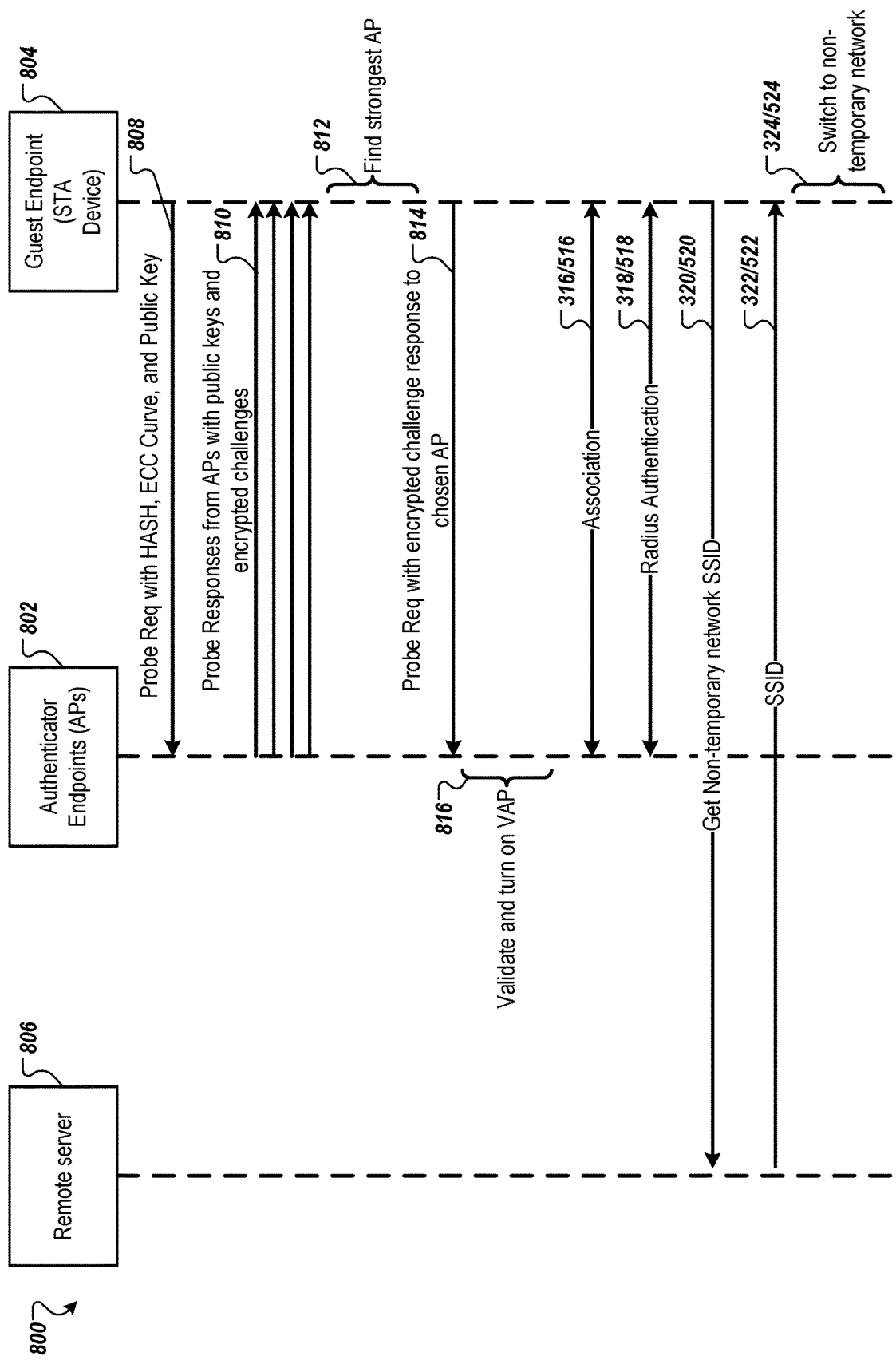
FIG. 8 is a sequence diagram of a method of operations to prevent probe request attacks from rogue devices on a zero-touch provisioning (ZTP) VAP using a secured cloud-assisted P2P authentication exchange protocol according to one embodiment.

FIG. 8 is a sequence diagram of a method of operations to prevent probe request attacks from rogue devices on a zero-touch provisioning (ZTP) VAP using a secured cloud-assisted P2P authentication exchange protocol according to one embodiment. The method 800 can be performed by processing logic that comprises hardware (e.g., circuitry, dedicated logic, programmable logic, microcode, etc.), software, firmware, or a combination thereof. In one embodiment, the method 800 can be performed by any of the authenticator endpoints, guest endpoints, and remote servers described herein and illustrated with respect to FIGS. 1-7.

In some cases, a rogue (e.g., malicious) device can attempt to imitate a valid guest endpoint by sending an attack probe request and keeping a VAP (such as a ZTP VAP) on indefinitely. The rogue device can attempt to send a probe request to the authenticator endpoint periodically to keep the VAP on indefinitely. In order to ensure that a rogue device does not imitate a valid guest endpoint by sending an attack probe request, a challenge request and response protocol can be used to authenticate a guest endpoint operating on a guest station before an authenticator endpoint turns on a VAP. The method 800 outlines the challenge request and response protocol. The challenge request and response protocol can be used to authenticate a guest endpoint before an authenticator endpoint turns on the VAP.

An authenticator endpoint 802 can validate a hash of a guest endpoint 804, but the authenticator endpoint 802 additionally needs to be able to prevent probe request attacks against a ZTP VAP. The authenticator endpoint 802 should activate a VAP only for valid guest endpoints. The method 800 provides a method to only activate a VAP on an authenticator endpoint 802 that is necessary, and to keep other VAPs on other authenticator endpoints deactivated. The method 800 provides a method to locally (e.g., without involving a remote server 806 of the cloud) prevent a probe request attack by a rogue guest endpoint by using a probe request-response frame. The probe request-response frame can be sent within a limited duration of time.

Referring back to FIG. 8, an authenticator endpoint 602 can operate on an AP and a guest endpoint 804 can operate on a guest station. The secured P2P cloud-assisted authentication exchange protocol begins when the guest endpoint 804 sends a first probe request (operation 808). The authenticator endpoint 802 receives the first probe request. The first probe request can include an information element (such as described in reference to FIG. 5). The first probe request includes a first hash including a DSN, a MAC address, and a certificate of the guest endpoint 804. The first probe further includes an identifier of an elliptic-curve cryptography (ECC) curve that is determined (or chosen) by the guest endpoint 804. The first probe request further includes a first public key associated with the guest endpoint 804. The guest endpoint 804 can generate a first public/private key pair including the first public key and a first private key associated with the guest endpoint 804. The guest endpoint generates the first public/private key pair using the ECC curve. The first hash, the identifier of the ECC curve, and the first public key can be included in an information element and sent as the first probe request. The information element includes a first field (GUEST_ENDPOINT_HASH) that includes the first hash, a second field (VIRTUAL_VAP_ECC_CURVE) that includes the identifier of the ECC, and a third field (VIRTUAL_VAP_ECC_CURVE_PUB_KEY) that includes the first public key. The authenticator endpoint 802 receives the first probe request and the information element. The authenticator endpoint 802 generates a second public/private key pair including a second public key and a second private key associated with the authenticator endpoint 802. The authenticator endpoint 802 identifies an ECC curve based on the identifier of the ECC curve in the first hash. The authenticator endpoint 802 generates the second public/private key pair using the ECC curve (e.g., that is identified by the identifier of the ECC curve of the first hash, and that the guest endpoint 804 uses to generate the first public/private key pair). The authenticator endpoint 802 generates a first challenge value and a shared secret. The challenge value can be a random value, a shared secret, or the like. The authenticator endpoint generates a first encrypted challenge value by encrypting the first challenge value with the ECC curve and the second private key. The authenticator endpoint 802 sends a first response to the guest endpoint 804 (operation 810). The first response includes the first encrypted challenge value and the shared secret. The first response further includes the second public key associated with the authenticator endpoint 802. The first response is sent as an information element including a fourth field (VIRTUAL_VAP_CHALLENGE) that includes the first encrypted challenge value and the shared secret. The information element further includes a fifth field (VIRTUAL_VAP_ECC_CURVE_PUB_KEY) that includes the second public key. The guest endpoint 804 uses the second public key associated with the authenticator endpoint 802 to decrypt the first encrypted challenge value and obtain the shared secret. The guest endpoint 804 obtains a decrypted challenge value by decrypting the first encrypted challenge value. The guest endpoint encrypts the decrypted challenge value using the shared secret to obtain a second encrypted challenge value. The guest endpoint 804 sends a third probe request to the authenticator endpoint 802 and the authenticator endpoint 802 receives the third probe request (operation 814). The third probe request includes the second encrypted challenge value. The authenticator endpoint 802 generates a second challenge value by decrypting the second encrypted challenge value. The authenticator endpoint checks if the second challenge value matches the first challenge value. The VAP is activated for the amount of time in response to the second challenge value matching the first challenge value. The method 800 completes the operations 316-324 of FIG. 3 and 516-524 of FIG. 5 as described and illustrated herein and the method 800 ends.

In one embodiment, the guest endpoint 804 sends multiple broadcast probe requests (e.g., first probe requests) to multiple authenticator endpoints, as described with respect to FIG. 4. The guest endpoint 804 receives the first response from the authenticator endpoint 802. The guest endpoint 804 measures an RSSI of the first response from the authenticator endpoint 802. The guest endpoint 504 further receives additional probe responses (similar to the first response from the authenticator endpoint 802) from the multiple authenticator endpoints, and the guest endpoint 804 measures an RSSI of each of the additional probe responses. The guest endpoint 804 determines that the probe response from the authenticator endpoint 802 has the strongest RSSI (operation 812). The guest endpoint 804 determines to send the third response to the authenticator endpoint 802. In other embodiments, the guest endpoint 804 can determine that a probe response from a different authenticator endpoint has the strongest RSSI and the guest endpoint 804 can determine to send the third response to the other authenticator endpoint.

The information element can be a Vendor-specific information element and can include a TLV table. The TLV table can include a first entry that is GUEST_ENDPOINT_HASH. The length of the first entry is the length of the hash of the guest endpoint and the TLV value includes the DSN, a first MAC address, a second MAC address, and a certificate of the guest endpoint. The TLV table can include a second entry that is VIRTUAL_VAP_CHALLENGE which can be a field that the authentication endpoint can send to the guest endpoint as a measure to ensure that the guest endpoint is not a rogue device imitating a valid guest endpoint. A length of the VIRTUAL_VAP_CHALLENGE can be a length of a challenge value generated by the authentication endpoint. For example, the challenge value can include alphanumeric characters, numerical values, and the like. In some embodiments, the VIRTUAL_VAP_CHALLENGE represents an encrypted challenge value. The TLV value is the challenge value that is generated by the authentication endpoint. The TLV can include a third entry that is VIRTUAL_VAP_CHALLENGE_RSP which is generated by the guest endpoint by decrypting the VIRTUAL_VAP_CHALLENGE. A length of the third entry is a length of the response of the guest endpoint to the VIRTUAL_VAP_CHALLENGE that it received from the authentication endpoint. The TLV value of the VIRTUAL_VAP_CHALLENGE_RSP includes a response hash which includes a decrypted virtual VAP challenge and the decrypted hash of the guest endpoint. The TLV table can include a fourth entry that is VIRTUAL_VAP_ECC_CURVE. The TLV table can include a fifth entry that is VIRTUAL_VAP_ECC_CURVE_PUB_KEY. A length of the fifth entry is a size of the ECC public key. A TLV value of the fifth entry is the ECC public key.

In one embodiment, the information element can be a Vendor-specific information element, and can be structured as follows:
Vendor-Specific Information Element
Element ID: 221
Length: <length of Vendor-specific TLVs+length of OUI>
OUI: 68-54-FD
enum Vendor-specificTLVType {
GUEST_ENDPOINT_HASH,
VIRTUAL_VAP_CHALLENGE,
VIRTUAL_VAP_CHALLENGE_RSP,
VIRTUAL_VAP_ECC_CURVE,
VIRTUAL VAP ECC PUB KEY
};
Enum Vendor-specificECCCurveType {
secp256r1, // NIST approved
secp256k1, // Used by Bitcoin
};
Vendor-Specific TLV Table processing logic receives the first request from the second wireless device. In one embodiment, the information includes a DSN, a MAC address, and a certificate of the second wireless device. The processing logic determines that the information matches the second information (block 904). In one embodiment, the processing logic receives the second information as part of a table (e.g., such as a hash table). The processing logic receives the table from a remote server operating on a cloud and the table includes at least the second information. The second information is stored in a memory coupled to the processing logic. The second information includes a time value that is indicative of a validity period for a first AP (e.g., a VAP). The second information further includes a group identifier associated with the second wireless device. The processing logic activates the first AP (block 906). The first AP has a modified SSID having the group identifier appended to a first SSID. In one embodiment, the processing logic sends a response including a modified SSID to the second wireless device. The processing logic sends the response responsive to activating the first AP. The processing logic authenticates the second wireless device using the first AP (block 908). The processing logic can authenticate the second wireless device with the first AP responsive to determining that the information matches the second information. The processing logic sends credentials and a second SSID to the second wireless device (block 910). The processing logic receives from the second wireless device a second request to connect to first wireless device via the second AP (block 912). The second AP has the second SSID that is different than the first SSID. The second request includes the second SSID and the credentials. The processing logic authenticates the second wireless device with the second AP (block 914). The processing logic can authenticate the second wireless device using the second AP based at least in part on the credentials. The processing logic deactivates the first AP after expiration of an amount of time equal to the time value (block 916); the method ends.

| TLV Type | TLV Length | TLV Value |
| --- | --- | --- |
| GUEST_ENDPOINT_HASH | Length of hash | Hash of Data: DSN1xMAC11xMAC12xCert1 |
| VIRTUAL_VAP_CHALLENGE | Length of random challenge | Random value |
| VIRTUAL_VAP_CHALLENGE_RSP | Length of response to Virtual VAP challenge | Hash of (Virtual VAP challenge, Hash of Data) |
| VIRTUAL_VAP_ECC_CURVE | Sizeof Enum | Vendor-specificECCCurveTypeEnum |
| VIRTUAL_VAP_ECC_CURVE_PUB_KEY | Sizeof ECC Public key | ECC Public Key |

Figure 9:
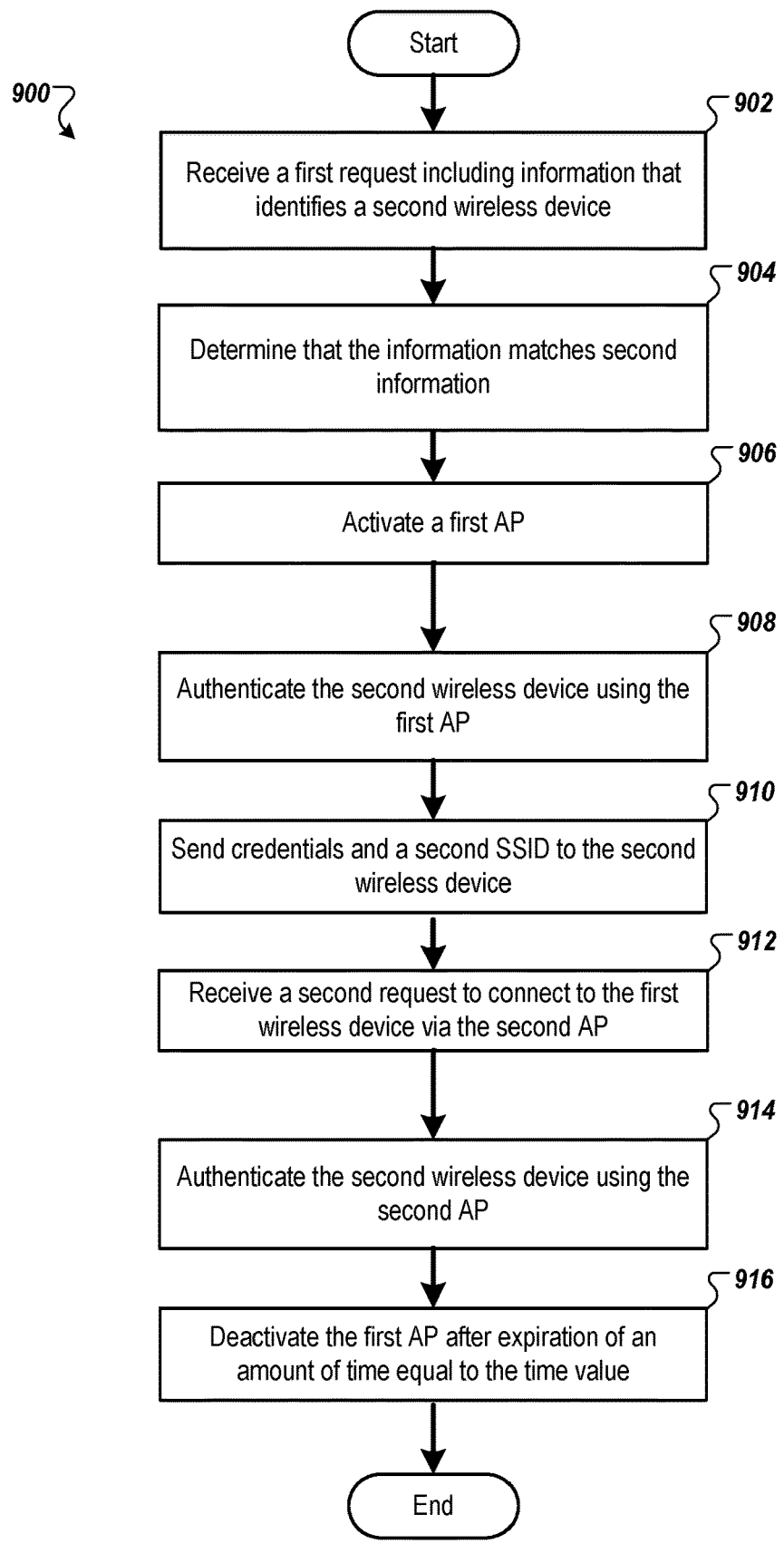
FIG. 9 is a flow diagram illustrating a method of operations of a secured P2P cloud-assisted authentication exchange protocol to automatically authenticate, turn on, and tear down a VAP according to one embodiment.

FIG. 9 is a flow diagram illustrating a method 900 of operations of a secured P2P cloud-assisted authentication exchange protocol to automatically authenticate, turn on, and tear down a VAP according to one embodiment. The method 900 can be performed by processing logic that comprises hardware (e.g., circuitry, dedicated logic, programmable logic, microcode, etc.), software, firmware, or a combination thereof. In one embodiment, the method 900 can be performed by any of the authenticator endpoints described herein and illustrated with respect to FIGS. 1-8. In one embodiment, the processing logic is processing logic of a first wireless device.

Referring back to FIG. 9, the method 900 begins by the processing logic receiving a first request including information that identifies a second wireless device (block 902). The In one embodiment, the processing logic determines that the table (that the processing logic receives from the remote server) does not include the second information, responsive to the processing logic receiving the first request with the information (e.g., in block 902). The processing logic sends a request to the remote server for the second information. The processing logic receives the second information from the remote server. The processing logic stores the second information in the table in the memory coupled to the processing logic.

In a further embodiment, the processing logic, prior to activating the first AP, determines a signal strength indicator value that is indicative of a wireless link between the first wireless device and the second wireless device. The signal strength indicator can be an RSSI. The signal strength indicator can be a measure of a quality of a wireless link between the first wireless device and the second wireless device. The processing logic determines that the signal strength indicator value is greater than a threshold value. In one embodiment, the processing logic receives the threshold value as part of the first request. In another embodiment, the second information includes the threshold value. The processing logic activates the VAP (block 906) based at least in part on determining that the signal strength indicator value is greater than the threshold value.

In another embodiment, at block 904, the processing logic can determine that the information does not match the second information. The processing logic does not active the VAP and the method 900 ends.

In another embodiment, the processing logic receives a third request from a third wireless device. The third request includes third information identifying the third wireless device. In one embodiment, the third information includes a second DSN, a second MAC address, and a second certificate of the third wireless device. The processing logic determines that the third information matches fourth information. In one embodiment, the processing logic receives the third information as part of a table (e.g., such as a hash table). The processing logic receives the table from a remote server operating on a cloud and the table includes at least the third information. The third information includes a second time value that is indicative of a second validity period for a second VAP. The third information further includes a second group identifier associated with the third wireless device. The processing logic activates the second VAP. The second VAP has a second modified SSID having the second group identifier appended to a third SSID. In one embodiment, the processing logic sends a response including the third SSID and the second group identifier to the third wireless device. The processing logic sends the response responsive to activating the second VAP. The processing logic authenticates the third wireless device with the second VAP. The processing logic can authenticate the third wireless device with the second VAP responsive to determining that the third information matches the fourth information. The processing logic sends the credentials and the second SSID to the third wireless device. The processing logic receives from the third wireless device a fourth request to connect to the second AP. The second AP has the second SSID that is different than the third SSID. The fourth request includes the credentials. The processing logic authenticates the third wireless device with the second AP. The processing logic can authenticate the third wireless device with the second AP based at least in part on the credentials. The processing logic deactivates the second VAP after an amount of time equal to the second time value is expired; the method ends.

Figure 10:
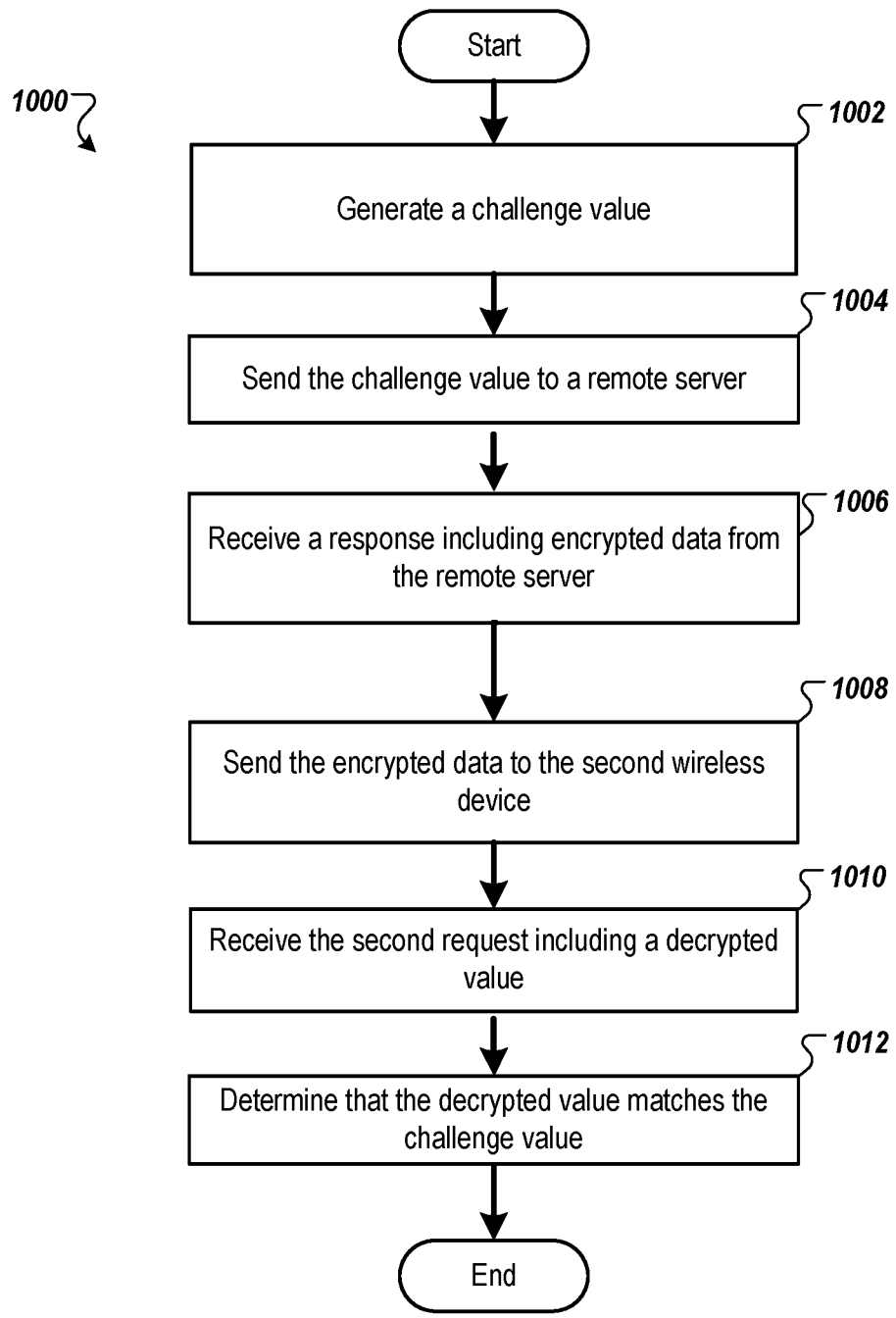
FIG. 10 is a flow diagram illustrating a method of a cloud-based challenge and response protocol to automatically authenticate, turn on, and tear down a VAP according to one embodiment.

FIG. 10 is a flow diagram illustrating a method 1000 of a cloud-based challenge and response protocol to automatically authenticate, turn on, and tear down a VAP according to one embodiment. The method 1000 can be performed by processing logic that comprises hardware (e.g., circuitry, dedicated logic, programmable logic, microcode, etc.), software, firmware, or a combination thereof. In one embodiment, the method 1000 can be performed by any of the authenticator endpoints described herein and illustrated with respect to FIGS. 1-8. In one embodiment, the processing logic is processing logic of a first wireless device.

The method 1000 can be performed as a sub-operation of the method 900 of FIG. 9. For example, the method 1000 can be performed between blocks 902 and 906 of FIG. 9. Referring back to FIG. 10, the method 1000 begins by the processing logic receiving the first request including the information that identifies the second wireless device (block 902 of FIG. 9). The processing logic generates a challenge value (block 1002). The processing logic sends the information and the challenge value to a remote server (block 1004). The processing logic receives a response from the remote server (block 1006). The response includes encrypted data which includes the information and the challenge value. The encrypted data is encrypted by the remote server using a public key associated with the second wireless device. The processing logic sends the encrypted data to the second wireless device (block 1008). The second wireless device can decrypt the encrypted data using a private key associated with the second wireless device. The processing logic receives a second request that includes a decrypted value of the challenge value (block 1010), the decrypted value being based on the encrypted data. The second request can be the same second request as described with respect to FIG. 9. The processing logic determines that the decrypted value matches the challenge value (block 1012). The processing logic invalidates the challenge value and the method ends. In one embodiment, the method 1000 ends at block 906 of the method 900.

In another embodiment, the processing logic receives the first probe request from the second wireless device. The first probe request includes a first hash of the DSN, the MAC address, the certificate of the second wireless device, or any combination thereof. The processing logic generates a random string. The processing logic sends the random string and the first hash to the remote server. The processing logic receives a second response from the remote server. The second response includes encrypted data that includes the first hash and the random string. The encrypted data is encrypted using the public key associated with the second wireless device. The processing logic sends the encrypted data as part of the first response to the second wireless device. The processing logic receives a decrypted value from the second wireless device. The processing logic determines that the decrypted value matches the random string and activates the VAP for the amount of time in response to the decrypted value matching the random string. The processing logic invalidates the random string.

Figure 11:
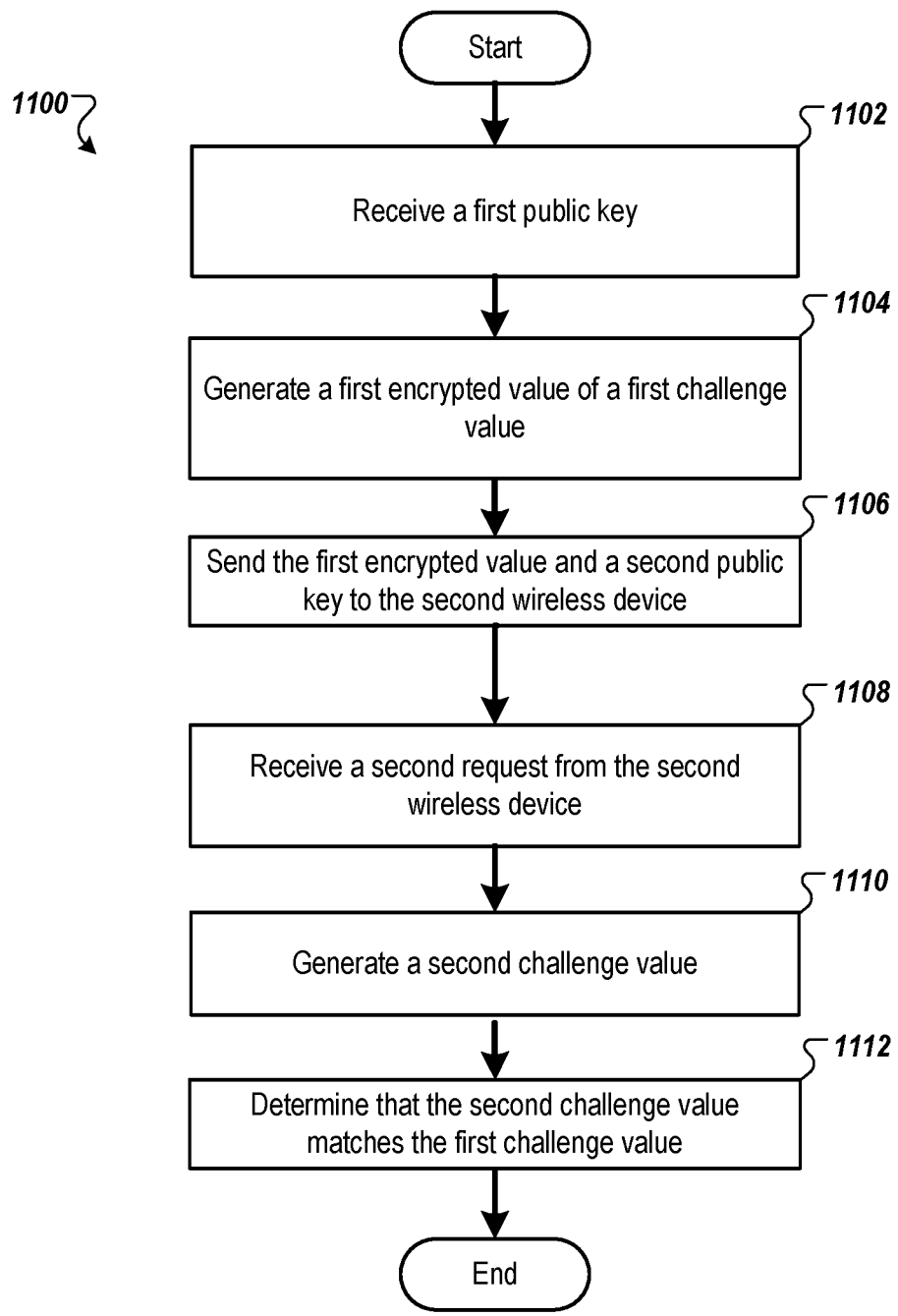
FIG. 11 is a flow diagram illustrating a method of a challenge and response protocol to automatically authenticate, turn on, and tear down a VAP according to one embodiment.

FIG. 11 is a flow diagram illustrating a method 1100 of a challenge and response protocol to automatically authenticate, turn on, and tear down a VAP according to one embodiment. The method 1100 can be performed by processing logic that comprises hardware (e.g., circuitry, dedicated logic, programmable logic, microcode, etc.), software, firmware, or a combination thereof. In one embodiment, the method 1100 can be performed by any of the authenticator endpoints described herein and illustrated with respect to FIGS. 1-8. In one embodiment, the processing logic is processing logic of a first wireless device.

The method 1100 can be performed as a sub-operation of the method 900 of FIG. 9. For example, the method 1100 can be performed between blocks 902 and 906 of FIG. 9. Referring back to FIG. 11, the method 1100 begins by the processing logic receiving the first request including the information that identifies the second wireless device (block 902 of FIG. 9). The processing logic receives a first public key as part of the first request (block 1102). The first public key is associated with the first wireless device. The processing logic generates a first encrypted value of the first challenge value using at least the first public key (block 1104). The processing logic sends the first encrypted value and a second public key to the second wireless device (block 1106). The second public key is associated with the second wireless device. The processing logic receives a second request from the second wireless device (block 1108). The second request includes a second encrypted value. The processing logic generates a second challenge value by decrypting the second encrypted value (block 1110). The processing logic decrypts the second encrypted value using a second private key associated with the second wireless device. The processing logic determines that the second challenge value matches the first challenge value. The processing logic invalidates the first challenge value. The method ends. In one embodiment, the method 1100 ends at block 906 of the method 900.

In a further embodiment, the processing logic receives an identifier of an ECC curve as part of the first response. The processing logic generates the first encrypted value using the ECC curve and the first public key.

In another embodiment, the processing logic receives an identifier of an ECC curve and a public key associated with the second wireless device as part of the first request. The processing logic generates a first challenge value. The processing logic generates a first encrypted challenge value by encrypting the first challenge value with the ECC curve. The processing logic sends the first encrypted challenge value to the second wireless device as part of the first response. The processing logic receives a third request from the second wireless device, with the third request containing a second encrypted challenge value. The processing logic generates a second challenge value by decrypting the second encrypted challenge value. The processing logic determines that the second challenge value matches the first challenge value. In response, the processing logic activate the VAP for the amount of time.

Figure 12:
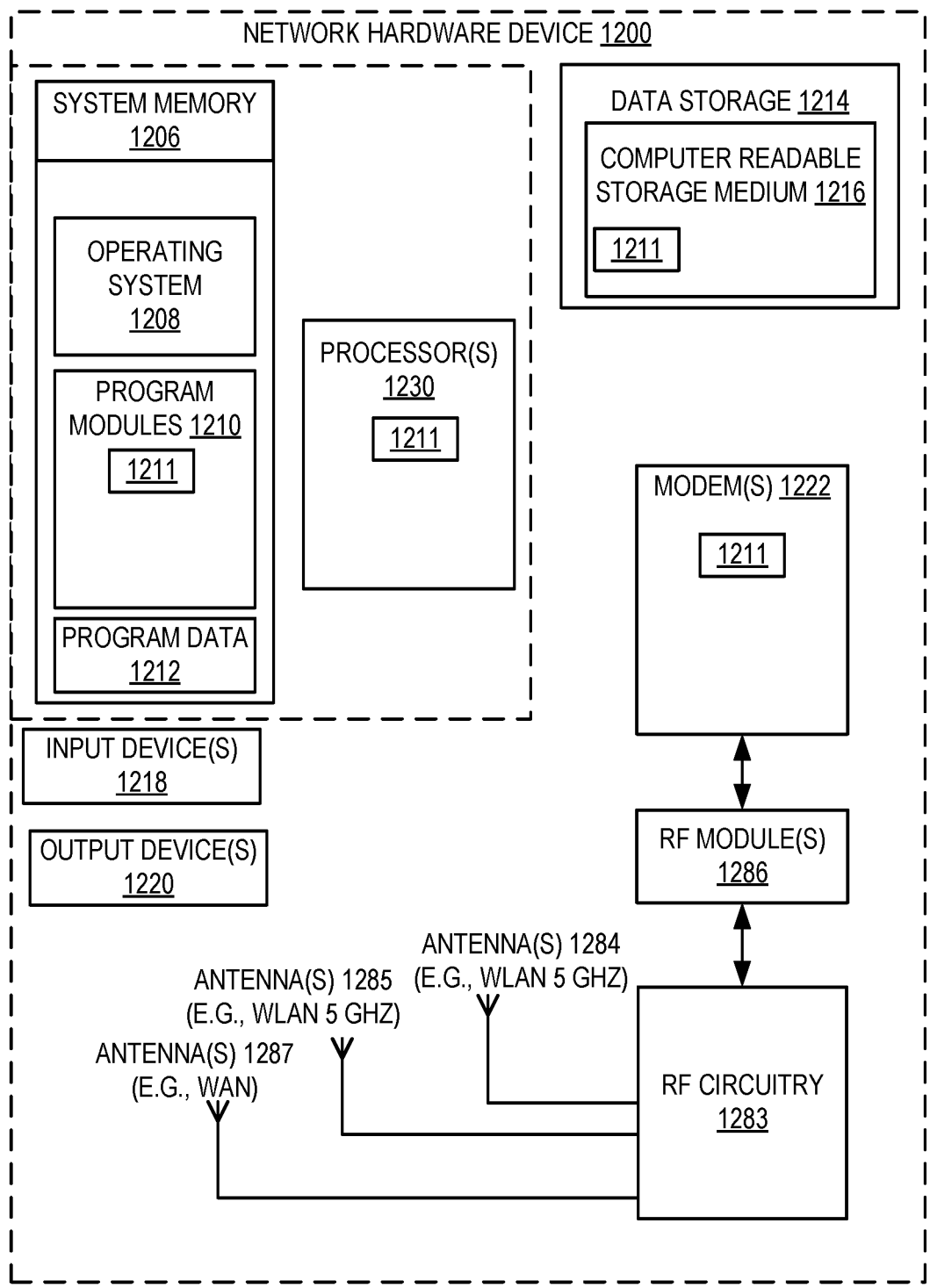
FIG. 12 is a block diagram of a network hardware device for providing a secure P2P cloud-assisted authentication exchange protocol according to one embodiment.

FIG. 12 is a block diagram of a network hardware device 1200 for providing a secure P2P cloud-assisted authentication exchange protocol according to one embodiment. The network hardware device 1200 may correspond to any of the APs, guest stations, or remote servers described above with respect to FIGS. 1-11. Alternatively, the network hardware device 1200 may be other electronic devices, as described herein.

The network hardware device 1200 includes one or more processor(s) 1230, such as one or more CPUs, microcontrollers, field programmable gate arrays, or other types of processors. The network hardware device 1200 also includes system memory 1206, which may correspond to any combination of volatile and/or non-volatile storage mechanisms. The system memory 1206 stores information that provides operating system component 1208, various program modules 1210, program data 1212, and/or other components. In one embodiment, the system memory 1206 stores instructions of methods to control operation of the network hardware device 1200. The network hardware device 1200 performs functions by using the processor(s) 1230 to execute instructions provided by the system memory 1206. In one embodiment, the program modules 1210 may include an authenticator endpoint or a group endpoint 1211. The authenticator/group endpoint 1211 may perform some of the operations of the secured P2P cloud-assisted authentication exchange protocols described herein.

The network hardware device 1200 also includes a data storage device 1214 that may be composed of one or more types of removable storage and/or one or more types of non-removable storage. The data storage device 1214 includes a computer-readable storage medium 1216 on which is stored one or more sets of instructions embodying any of the methodologies or functions described herein. Instructions for the program modules 1210 (e.g., authenticator/group endpoint 1211) may reside, completely or at least partially, within the computer-readable storage medium 1216, system memory 1206 and/or within the processor(s) 1230 during execution thereof by the network hardware device 1200, the system memory 1206 and the processor(s) 1230 also constituting computer-readable media. The network hardware device 1200 may also include one or more input devices 1218 (keyboard, mouse device, specialized selection keys, etc.) and one or more output devices 1220 (displays, printers, audio output mechanisms, etc.).

The network hardware device 1200 further includes a modem 1222 to allow the network hardware device 1200 to communicate via a wireless connections (e.g., such as provided by the wireless communication system) with other computing devices, such as remote computers, an item providing system, and so forth. The modem 1222 can be connected to one or more radio frequency (RF) modules 1286. The RF modules 1286 may be a wireless local area network (WLAN) module, a WAN module, PAN module, GPS module, or the like. The antenna structures (antenna(s) 1284, 1285, 1287) are coupled to the RF circuitry 1283, which is coupled to the modem 1222. The RF circuitry 1283 may include radio front-end circuitry, antenna switching circuitry, impedance matching circuitry, or the like. The antennas 1284 may be GPS antennas, NFC antennas, other WAN antennas, WLAN or PAN antennas, or the like. The modem 1222 allows the network hardware device 1200 to handle both voice and non-voice communications (such as communications for text messages, multimedia messages, media downloads, web browsing, etc.) with a wireless communication system. The modem 1222 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1222 may generate signals and send these signals to antenna(s) 1284 of a first type (e.g., WLAN 5 GHz), antenna(s) 1285 of a second type (e.g., WLAN 2.4 GHz), and/or antenna(s) 1287 of a third type (e.g., WAN), via RF circuitry 1283, and RF module(s) 1286 as descried herein. Antennas 1284, 1285, 1287 may be configured to transmit in different frequency bands and/or using different wireless communication protocols. The antennas 1284, 1285, 1287 may be directional, omnidirectional, or non-directional antennas. In addition to sending data, antennas 1284, 1285, 1287 may also receive data, which is sent to appropriate RF modules connected to the antennas. One of the antennas 1284, 1285, 1287 may be any combination of the antenna structures described herein.

In one embodiment, the network hardware device 1200 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1222 is shown to control transmission and reception via antenna (1284, 1285, 1287), the network hardware device 1200 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "activating," "authenticating," "sending," "deactivating," "generating," "invalidating," "storing," "associating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
receiving, by a first wireless device, a first request from a second wireless device, the first request comprising information that identifies the second wireless device;
determining, by the first wireless device, that the information matches second information stored at the first wireless device, the second information comprising i) a time value and ii) a group identifier associated with the second wireless device;
activating, by the first wireless device, a first access point (AP), the first AP having a modified service set identifier (SSID) comprising the group identifier appended to a first SSID;
authenticating, by the first wireless device, the second wireless device using the first AP;
sending, by the first wireless device, credentials and a second SSID to the second wireless device, the second SSID being associated with a second AP of the first wireless device and being different than the first SSID;
receiving, by the first wireless device from the second wireless device, a second request to connect to the first wireless device via the second AP, the second request comprising the second SSID and the credentials;
authenticating, by the first wireless device, the second wireless device using the second AP; and
deactivating, by the first wireless device, the first AP after expiration of an amount of time equal to the time value.

2. The method of claim 1, wherein prior to activating the first AP, the method further comprising:
determining, by the first wireless device, a signal strength indicator value indicative of a wireless link between the first wireless device and the second wireless device; and
determining, by the first wireless device, that the signal strength indicator value is greater than a threshold value, wherein the second information further comprises the threshold value.

3. The method of claim 1, wherein the information comprises a hash of at least one of a device serial number (DSN), a media access control (MAC) address, or a certificate of the second wireless device.

4. The method of claim 1, further comprising receiving, by the first wireless device, data from a remote server, the data comprising the second information.

5. The method of claim 1, further comprising sending, by the first wireless device, a response to the second wireless device via the first AP, the response comprising the modified SSID.

6. The method of claim 1, wherein activating the first AP further comprises:
generating, by the first wireless device, a challenge value;
sending, by the first wireless device, the information and the challenge value to a remote server;
receiving, by the first wireless device from the remote server, encrypted data comprising the information and the challenge value, the encrypted data being encrypted using a public key associated with the second wireless device;
sending, by the first wireless device, the encrypted data to the second wireless device;
receiving, by the first wireless device from the second wireless device as part of the second request, a decrypted value based on the challenge value; and
determining, by the first wireless device, that the decrypted value matches the challenge value.

7. The method of claim 1, wherein activating the first AP further comprises:
receiving, by the first wireless device from the second wireless device, a first public key concurrently with the first request, the first public key being associated with the second wireless device;
generating, by the first wireless device, a first encrypted value using a first challenge value and the first public key;
sending, by the first wireless device to the second wireless device, the first encrypted value and a second public key associated with the first wireless device;
receiving, by the first wireless device, a third request from the second wireless device, the third request comprising a second encrypted value;
generating, by the first wireless device, a second challenge value by decrypting the second encrypted value using a second private key associated with the first wireless device; and
determining, by the first wireless device, that the second challenge value matches the first challenge value.

8. The method of claim 7, further comprising:
receiving, by the first wireless device as part of the first request, an identifier of an elliptic-curve cryptography (ECC) curve, wherein generating the first encrypted value comprises generating the first encrypted value using the ECC curve corresponding to the identifier and the first public key.

9. The method of claim 1, further comprising:
determining, by the first wireless device, that the first wireless device does not have the second information;
sending, by the first wireless device to a remote server, a request for the second information, the request comprising the first information; and
receiving, by the first wireless device from the remote server, the second information.

10. The method of claim 1, further comprising:
receiving, by the first wireless device, a third request from a third wireless device, the third request comprising third information that identifies the third wireless device;
determining, by the first wireless device, that the third information matches fourth information stored at the first wireless device, the fourth information further comprising i) a second time value and ii) a second group identifier associated with the third wireless device, the second group identifier being different than the group identifier;
activating, by the first wireless device, a third AP, the third AP having a second modified SSID comprising the second group identifier appended to a third SSID, wherein the third SSID, the first SSID, and the second SSID are different;
authenticating, by the first wireless device, the third wireless device using the third AP;
sending, by the first wireless device, the credentials and the second SSID to the third wireless device;
receiving, by the first wireless device from the third wireless device, a fourth request to connect to the first wireless device via the second AP, the fourth request comprising the second SSID and the credentials;
authenticating, by the first wireless device, the third wireless device using the second AP; and
deactivating, by the first wireless device, the third AP after expiration of an amount of time equal to the second time value.

11. A wireless device comprising:
a memory device to store instructions;
a radio;
an application processor coupled to the radio and the memory device, wherein the application processor is to execute the instructions to:
receive a first request from a second wireless device, the first request comprising information that identifies the second wireless device;
determine that the information matches second information stored in the memory device, the second information comprising i) a time value and ii) a group identifier associated with the second wireless device;
activate a first access point (AP), the first AP having has a modified service set identifier (SSID) comprising the group identifier appended to a first SSID;
authenticate the second wireless device using the first AP;
send credentials and a second SSID to the second wireless device, the second SSID being associated with a second AP of the wireless device and being different than the first SSID;
receive from the second wireless device a second request to connect to the wireless device via the second AP, the second request comprising the second SSID and the credentials;
authenticate the second wireless device using the second AP; and
deactivate the first AP after expiration of an amount of time equal to the time value.

12. The wireless device of claim 11, wherein the application processor, to activate the first AP, is to further execute the instructions to:
generate a challenge value;
send the information and the challenge value to a remote server;
receive encrypted data from the remote server, the encrypted data comprising the information and the challenge value;
send the encrypted data to the second wireless device;
receive, as part of the second request, a decrypted value based on the challenge value; and determine that the decrypted value matches the challenge value.

13. The wireless device of claim 11, wherein the application processor, to activate the first AP, is to further execute the instructions to:
receive from the second wireless device, a first public key concurrently with the first request, the first public key being associated with the second wireless device;
generate a first encrypted value using a first challenge value and at least the first public key;
send to the second wireless device the first encrypted value and a second public key associated with the wireless device;
receive a third request from the second wireless device, the third request comprising a second encrypted value;
generate a second challenge value by decrypting the second encrypted value using a second private key associated with the wireless device; and
determine that the second challenge value matches the first challenge value.

14. The wireless device of claim 13, wherein the application processor is to further execute the instructions to receive as part of the first request, an identifier of an elliptic-curve cryptography (ECC) curve, wherein generating the first encrypted value comprises generating the first encrypted value using the ECC curve corresponding to the identifier and the first public key.

15. The wireless device of claim 11, wherein the information comprises a hash of at least one of a device identifier, a media access control (MAC) address, or a certificate of the second wireless device.

16. The wireless device of claim 11, wherein the application processor is to further execute the instructions to:
determine that the wireless device does not have the second information;
send a request for the second information to a remote server, the request comprising the information; and
receive the second information from the remote server.

17. The wireless device of claim 11, wherein the application processor is to further execute the instructions to:
receive a third request from a third wireless device, the third request comprising third information that identifies the third wireless device;
determine that the third information matches fourth information stored at the wireless device, the fourth information further comprising i) a second time value and ii) a second group identifier associated with the third wireless device, the second group identifier being different than the group identifier;
activate a third AP, the third AP having a second modified SSID comprising the second group identifier appended to a third SSID, wherein the third SSID, the first SSID, and the second SSID are different;
authenticate the third wireless device using the third AP;
send the credentials and the second SSID to the third wireless device;
receive a fourth request from the third wireless device to connect to the wireless device via the second AP, the fourth request comprising the second SSID and the credentials;
authenticate the third wireless device using the second AP; and
deactivate the third AP after expiration of an amount of time equal to the second time value.

18. An electronic device comprising:
a memory device to store instructions;
a processor operatively coupled to the memory device, wherein the processor is to execute the instructions to:
receive a first request from a second device, the first request comprising first data associated with the second device;
determine that the first data matches second data stored in the memory device, the second data comprising i) a time value and ii) a group identifier associated with the second device;
activate a first access point (AP), the first AP having has a modified service set identifier (SSID) comprising the group identifier appended to a first SSID;
authenticate the second device using the first AP;
send credentials and a second SSID to the second device, the second SSID being associated with a second AP of the electronic device and being different than the first SSID;
receive from the second device a second request to connect to the electronic device via the second AP, the second request comprising the second SSID and the credentials;
authenticate the second device using the second AP; and
deactivate the first AP after expiration of an amount of time equal to the time value.

19. The electronic device of claim 18, wherein the processor, to activate the first AP, is to further execute the instructions to:
generate a challenge value;
send the first data and the challenge value to a remote server;
receive encrypted data from the remote server, the encrypted data comprising the first data and the challenge value;
send the encrypted data to the second device;
receive, as part of the second request, a decrypted value based on the challenge value; and
determine that the decrypted value matches the challenge value.

20. The electronic device of claim 18, wherein the processor, to activate the first AP, is to further execute the instructions to:
receive from the second device, a first public key concurrently with the first request, the first public key being associated with the second device;
generate a first encrypted value using a first challenge value and at least the first public key;
send to the second device the first encrypted value and a second public key associated with the electronic device;
receive a third request from the second device, the third request comprising a second encrypted value;
generate a second challenge value by decrypting the second encrypted value using a second private key associated with the electronic device; and
determine that the second challenge value matches the first challenge value.

* * * * *